United States Patent
Carlson et al.

(10) Patent No.: US 10,598,128 B1
(45) Date of Patent: Mar. 24, 2020

(54) ATTITUDE CONTROL SYSTEM

(71) Applicant: Valley Tech Systems, Inc., Reno, NV (US)

(72) Inventors: Russell Carlson, Reno, NV (US); Dustin Barr, Reno, NV (US); Allen Yan, Reno, NV (US)

(73) Assignee: Valley Tech Systems, Inc., Reno, NV (US)

( * ) Notice: Subject to any disclaimer, the term of this patent is extended or adjusted under 35 U.S.C. 154(b) by 1116 days.

(21) Appl. No.: 14/875,424

(22) Filed: Oct. 5, 2015

Related U.S. Application Data

(63) Continuation-in-part of application No. 14/847,820, filed on Sep. 8, 2015, now Pat. No. 9,927,217.

(60) Provisional application No. 62/046,686, filed on Sep. 5, 2014, provisional application No. 62/058,813, filed on Oct. 2, 2014, provisional application No. 62/059,716, filed on Oct. 3, 2014.

(51) Int. Cl.
| | |
|---|---|
| *F02K 9/94* | (2006.01) |
| *F42B 15/01* | (2006.01) |
| *F02K 9/95* | (2006.01) |
| *F02K 9/80* | (2006.01) |
| *B64G 1/26* | (2006.01) |
| *B64G 1/24* | (2006.01) |

(52) U.S. Cl.
CPC ............... *F02K 9/94* (2013.01); *F02K 9/80* (2013.01); *F02K 9/95* (2013.01); *F42B 15/01* (2013.01); *B64G 1/244* (2019.05); *B64G 1/26* (2013.01); *F02K 9/805* (2013.01)

(58) Field of Classification Search
CPC ..... F02K 9/80; F02K 9/88; F02K 9/94; F02K 9/805; F42B 10/66; F42B 10/663; F42B 15/01; B64G 1/26; B64G 1/24; B64G 1/244
See application file for complete search history.

(56) References Cited

U.S. PATENT DOCUMENTS

| | | | |
|---|---|---|---|
| 3,266,237 A | 8/1966 | Crowell, Jr. et al. | |
| 3,293,855 A | 12/1966 | Cuttill et al. | |
| 3,724,217 A | 4/1973 | McDonald | |
| 4,023,355 A | 5/1977 | McDonald | |
| 4,840,024 A | * 6/1989 | McDonald | F02K 9/28 60/225 |

(Continued)

FOREIGN PATENT DOCUMENTS

| | | |
|---|---|---|
| JP | H5-70275 A2 | 3/1993 |
| WO | WO 2009/136887 A1 | 11/2009 |

OTHER PUBLICATIONS

Dubrow et al., Ballistics of Solid Propellants During Thrust Modulation—Solid Propellant Rocket Conference Ballistics of solid propellants during thrust modulation, American Institute of Aeronautics and Astronautics., Jan. 1964 (9 pp.).

(Continued)

*Primary Examiner* — Lorne E Meade

(74) *Attorney, Agent, or Firm* — Holland & Hart, LLP

(57) ABSTRACT

An attitude control system for a guided missile includes a gas generator, an accumulator coupled to the gas generator, and a valve positioned between the gas generator and the accumulator. The gas generator contains propellant that burns to provide hot gas to pressurize the accumulator. The valve is opened to recharge the accumulator with hot gas and closed when it is full. A vent valve can be included to extinguish the propellant in the gas generator. The accumulator can be coupled to thrusters that use the stored hot gas to adjust the attitude of the guided missile.

31 Claims, 30 Drawing Sheets

(56) References Cited

U.S. PATENT DOCUMENTS

| | | | |
|---|---|---|---|
| 5,133,183 | A | 7/1992 | Asaoka et al. |
| 5,613,299 | A | 3/1997 | Ring et al. |
| 6,205,378 | B1 | 3/2001 | Rodden et al. |
| 6,412,275 | B1 | 7/2002 | Perrucci |
| 6,651,438 | B2 | 11/2003 | McGrath et al. |
| 7,281,367 | B2 | 10/2007 | Rohrbaugh et al. |
| 7,770,380 | B2 | 8/2010 | Dulligan et al. |
| 7,788,900 | B2 | 9/2010 | Dulligan et al. |
| 8,051,640 | B2 | 11/2011 | Geisler et al. |
| 8,215,097 | B2 | 7/2012 | Cover et al. |
| 8,464,640 | B2 | 6/2013 | Sawka |
| 8,584,443 | B1 | 11/2013 | Carlson |
| 8,888,935 | B2 | 11/2014 | Grix et al. |
| 8,950,329 | B2 | 2/2015 | Villarreal et al. |
| 9,035,226 | B1 | 5/2015 | Jouse et al. |
| 9,914,671 | B1 | 3/2018 | McPherson |
| 2013/0097995 | A1* | 4/2013 | Schroeder ............... F02K 9/94 60/219 |
| 2018/0128207 | A1 | 5/2018 | Villarreal et al. |

OTHER PUBLICATIONS

Glascock, Characterization of Electric Solid Propellant Pulsed Microthrusters, Missouri University of Science and Technology, Masters Theses, 7598, 2016 (73 pp.).

Merkle et al., Extinguishment of Solid Propellants by Rapid Depressurization, Princeton University, Jul. 1969 (213 pp.).

Mongia et al., A Model for the Combustion and Extinction of Composite Solid Propellants During Depressurization, Combustion and Flame 22, 59-69, 1974 (11 pp.).

Sawka et al., Solid State Digital Propulsion Cluster Thrusters for Small Satellites Using High Performance Electrically Controlled Extinguishable Solid Propellants, 19th Annual AIAA/USU Conference on Small Satellites, Jun. 2005 (7 pp.).

Von Elbe et al., Extinguishment of Solid Propellants by Rapid Depressurization, AIAA Journal, vol. 6, No. 7, 1417-19, Jul. 1968 (3 pp.).

McGrath, ATK Advances in Solid Propulsion, presented to SPST, Oct. 9, 2014 (29 pp.).

U.S. Pat. No. 9,927,217 U.S. Appl. No. 14/847,820, Mar. 27, 2018 filed Sep. 8, 2015, Carlson et al., Attitude Control System.

Information about Related Patents, Patent Applications, and Patent Office Proceedings see the section below having the same title.

U.S. Pat. No. 9,927,217 U.S. Appl. No. 14/847,820, Mar. 27, 2018 filed Sep. 8, 2015, Valley Tech Systems, Inc., Attitude Control System.

U.S. Appl. No. 14/875,424, filed Oct. 5, 2015, Valley Tech Systems, Inc., Flight Vehicle Control System.

U.S. Appl. No. 15/935,630, filed Mar. 26, 2018, Valley Tech Systems, Inc., Method for Controlling a Flight Vehicle.

* cited by examiner

ATTITUDE CONTROL SYSTEM

CROSS-REFERENCE TO RELATED PATENT APPLICATIONS

This application claims the benefit of U.S. application Ser. No. 14/847,820, titled "Attitude Control System," filed on Sep. 8, 2015, now U.S. Pat. No. 9,927,217 which claims the benefit of U.S. Provisional Pat. App. No. 62/046,686, titled "VH2," filed on Sep. 5, 2014, U.S. Provisional Pat. App. No. 62/058,813, titled "High Temperature, High Pressure Valve System," filed on Oct. 2, 2014, U.S. Provisional Pat. App. No. 62/059,716, titled "Method for Increasing Operation of Solid Propellant, Gas Accumulator Systems," filed on Oct. 3, 2014, the entire contents of all of which are incorporated by reference into this document. In the event of a conflict, the subject matter explicitly recited or shown in this document controls over any subject matter incorporated by reference. The incorporated subject matter should not be used to limit or narrow the scope of the explicitly recited or depicted subject matter.

STATEMENT REGARDING FEDERALLY SPONSORED RESEARCH OR DEVELOPMENT

This invention was made with government support under the following contracts awarded by the Missile Defense Agency through the Department of Defense (DoD) Small Business Innovative Research Program (SBIR). The U.S. government has certain rights in the invention.
Contract No.: HQ0006-06-C-7479 (2006)
Contract No.: W9113-07-C-0142 (2007)
Contract No.: W9113M-08-0069 (2008)
Contract No.: W91260-09-C-0008 (2009)
Contract No.: HQ0147-13-C-7205 (2012)
Contract No.: HQ0147-14-C-7873 (2013)

BACKGROUND

One of the greatest threats facing the world today is the increasing proliferation of ballistic missiles and weapons of mass destruction. Despite reductions in the number of weapons deployed by the United States and the former Soviet Union, ballistic missile proliferation continues on a wide scale today and could increase as the technology is transferred. Countries invest in ballistic missiles because they provide the means to project power both in a regional and strategic context and a capability to launch an attack from a distance. A country with no ballistic missiles today can acquire them in a very short period of time, and these missiles could become available to nonstate terrorist groups.

Missile defense technology being developed, tested and deployed by the United States is designed to counter ballistic missiles of all ranges—short, medium, intermediate and long. Since ballistic missiles have different ranges, speeds, size and performance characteristics, the ballistic missile defense system is an integrated, "layered" architecture that provides multiple opportunities to destroy missiles and their warheads before they can reach their targets.

The system's architecture includes: (1) networked sensors (including space-based) and ground and sea based radars for target detection and tracking; (2) ground and sea based interceptor missiles for destroying a ballistic missile using either the force of a direct collision, called "hit-to-kill" technology, or an explosive blast fragmentation warhead; and (3) a command, control, battle management, and communications network providing the operational commanders with the needed links between the sensors and interceptor missiles.

One of the key components of the ballistic missile defense system is the standard missile 3 (SM-3), the latest design of which is the SM-3 Block 1B. It is a ship and/or land based missile used by the U.S. and its allies to intercept short to intermediate range ballistic missiles as part of the Aegis Ballistic Missile Defense System. Radar locates the ballistic missile and the Aegis weapon system calculates a solution on the target. Once a solution is in place, the missile is launched.

A solid fuel rocket booster launches the SM-3 out of a Mark 41 vertical launching system (VLS). After launch, the missile establishes communication with the launching platform (ship or ground installation) and proceeds towards the target. Once the booster or first stage burns out, it detaches, and a second stage solid-fuel dual thrust rocket motor (DTRM) takes over propulsion through the atmosphere. The missile continues to receive mid-course guidance information from the launching platform and is aided by GPS data.

The second stage rocket motor eventually burns out and detaches and a solid-fuel third-stage rocket motor (TSRM) takes over propulsion. The TSRM can propel the missile above the atmosphere if needed. The TSRM is pulse fired and provides propulsion for the SM-3 until approximately 30 seconds to intercept when the TSRM separates from the kinetic warhead (KW).

The KW is maneuvered using a throttleable divert and attitude control system (TDACS). The KW searches for the target using pointing data from the launching platform. The KW's sensors identify the target and attempt to identify the most lethal part of the target. The TDACS maneuvers the KW into the target for the final hit-to-kill impact. The KW provides 130 megajoules (96,000,000 ft·lbf, 31 kg TNT equivalent) of kinetic energy at the point of impact.

The KW often contains radar or optics used to detect and pinpoint the location of the target. The divert and attitude control system (DACS), such as the TDACS used with the SM-3 Block 1B missile, uses the information provided by the radar, optics, and other sensors to actuate thrusters and maneuver the KW into the target.

The DACS can maneuver the KW in various ways such as "diverting" the trajectory of the KW or adjusting the attitude (pitch, roll, and yaw) of the KW. Divert movements are typically performed to move the KW sideways or otherwise adjust its trajectory. Attitude adjustments are performed to control the orientation of the KW with respect to an inertial frame of frame or another entity, which is usually the target. For example, the DACS can adjust the attitude of the KW to position radar, optics, and other sensors towards the target. Divert maneuvers typically require substantially more total impulse than attitude adjustment maneuvers.

Although conventional DACS technologies, such as those used in the SM-3 Block 1B TDACS, have served us well, they also suffer from a number of performance deficiencies in the following areas: (1) operating time, (2) energy management (on/off capability), (3) mass, and (4) divert distance. Accordingly, it would be desirable to provide a DACS system that improves operating time, mass fraction, and performance, cost and mission assurance while maintaining the storability, safety and insensitivity advantages of a solid propulsion system.

SUMMARY

A number of representative embodiments are provided to illustrate the various features, characteristics, and advantages of the disclosed subject matter. The embodiments are provided in the context of a divert and attitude control system for a kinetic warhead (KW). It should be understood, however, that many of the concepts can be used in a variety of other settings, situations, and configurations. For example, the disclosed divert and attitude control system can be adapted for use with a variety of flight vehicles, especially guided missiles.

A divert and attitude control system (DACS) includes an attitude control system and a divert system. The DACS can be used with a variety of flight vehicles. For example, the DACS can be used as the DACS for the KW of a guided interceptor missile. The DACS can also be used with any of the other flight stages of a guided missile.

In some embodiments, the DACS uses an extinguishable solid propellant. The propellant is ignited to provide pressurized gas for the thrusters. In some embodiments, the DACS is comprised of a separate attitude control system and a separate divert system, where each of the separate systems includes separate propellant. In one embodiment, the propellant in the divert system is ignited by hot gas stored in attitude control system.

In some embodiments, the attitude control system is a low level attitude control system (LLACS). For example, the attitude control system that is part of the DACS for the KW can be a LLACS. The LLACS can provide attitude control thrust throughout the final flight stage including when the divert system is active (burning propellant) and inactive (extinguished).

In some embodiments, the propellant in the attitude control system is repeatedly ignited and extinguished. In one embodiment, the hot gas generated by the propellant in the attitude control system is used to repeatedly ignite the propellant in the divert system.

In some embodiments, the DACS can provide continuous attitude control capability for a relatively long period of time. For example, the DACS can provide continuous attitude control capability for 100 to 2000 seconds. Also, the DACS can provide continuous attitude control capability for at least 100 seconds, at least 200 seconds, at least 300 seconds, at least 400 seconds, at least 500 seconds, and so forth.

In some embodiments, the DACS includes an attitude control system that is separate from but in fluid communication with the divert system. The two systems are in fluid communication in the sense that hot gas generated from the attitude control system can be channeled to the divert system to ignite the propellant in the divert system. In some embodiments, the hot gas from the attitude control system is used to repeatedly ignite the propellant in the divert system thereby eliminating the need for igniters in the divert system.

The divert system may include an ignition valve, thrusters, and propellant. The ignition valve is positioned between the divert system and the attitude control system to selectively enable hot gas from the attitude control system to enter the divert system and ignite the propellant. The burning propellant provides hot gas for the divert thrusters to use for divert maneuvers.

In general, the divert system typically includes substantially more propellant than the attitude control system. In some embodiments, the additional propellant is provided because divert maneuvers require substantially more thrust than attitude adjustments. In one embodiment, the divert system includes at least 1.5× as much propellant as the attitude control system.

In some embodiments, the attitude control system may include a gas generator, an accumulator coupled to the gas generator, and a valve positioned between the gas generator and the accumulator. The gas generator includes propellant that burns to provide hot gas to the accumulator where the propellant is stored. The accumulator is coupled to attitude thrusters that use the hot gas in the accumulator to change the attitude of the flight vehicle.

The valve can be opened to recharge the accumulator with hot gas and, after it is full, closed to hold the pressurized hot gas in the accumulator. The valve can include various components that enable the accumulator to withstand the high temperatures and high pressures produced by the burning propellant. In one embodiment, the valve includes components made of a ceramic matrix composite such as C—ZrOC or C—SiC.

In some embodiments, the valve extends at least part way into the accumulator. In this configuration, the valve is pressurized when the accumulator is recharged with hot gas. After the accumulator is full and the valve is closed, the pressure inside the valve falls to ambient while the pressure in the accumulator remains. In this configuration, the pressure in the accumulator exerts hoop compression on the outside of the valve.

In some embodiments, the attitude control system includes a vent valve that is in fluid communication with the gas generator and the accumulator. The vent valve is used to extinguish the propellant in the gas generator when the propellant is not needed. For example, after the accumulator is recharged by the burning propellant, the valve to the accumulator is closed and the vent valve is opened. The sudden depressurization in the gas generator extinguishes the propellant.

In some embodiments, the attitude control system can operate in the following manner: An initial propellant charge is ignited in the accumulator with the valve closed. Hot gas fills the accumulator until the gas reaches a set pressure or initial threshold. At the set pressure threshold, the valve is opened. The hot gas flows from the accumulator to the gas generator and ignites the propellant in the gas generator for the first time. The gas generator produces additional hot gas and the pressure gradient reverses so that hot gas flows back into the accumulator.

The accumulator reaches a set point maximum pressure or upper threshold pressure at which the valve to the accumulator closes and the vent valve opens. The sudden depressurization extinguishes the propellant in the gas generator. When the pressure in the accumulator drops below a set point or lower threshold (due to attitude adjustments, etc.) or after a set amount of time, the accumulator is recharged by opening the valve and closing the vent valve. Hot gas flows from the accumulator to the gas generator and ignites the propellant. The hot gas from the gas generator pressurizes the accumulator and the cycle repeats itself. The accumulator can be recharged multiple times over the life of the attitude control system.

The Summary is provided to introduce a selection of concepts in a simplified form that are further described below in the Detailed Description. The Summary and the Background are not intended to identify key concepts or essential aspects of the disclosed subject matter, nor should they be used to constrict or limit the scope of the claims. For example, the scope of the claims should not be limited based on whether the recited subject matter includes any or all aspects noted in the Summary and/or addresses any of the issues noted in the Background.

DRAWINGS

The preferred and other embodiments are disclosed in association with the accompanying drawings in which.

DETAILED DESCRIPTION

Figure 1:
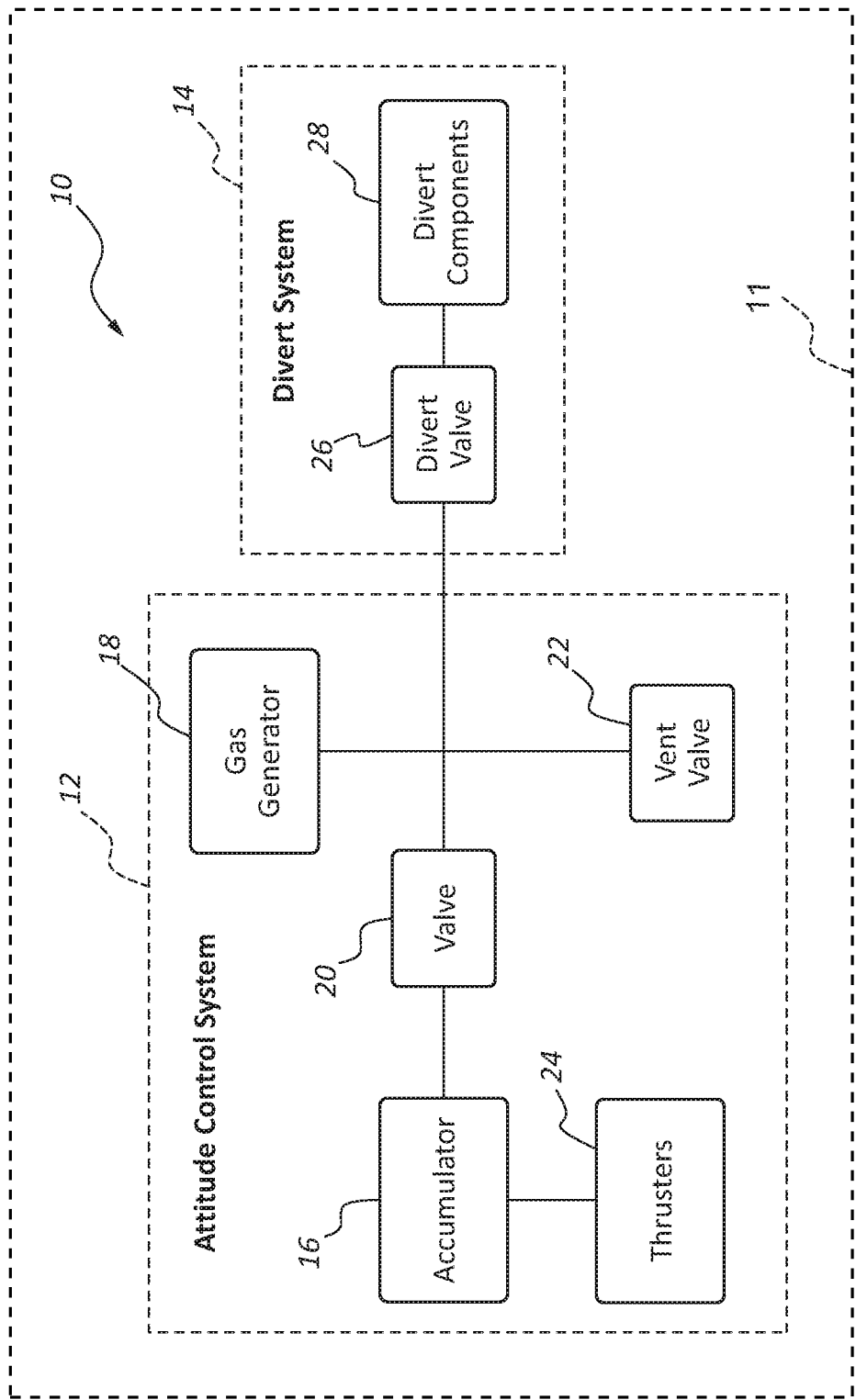
FIG. 1 is a conceptual diagram of a divert and attitude control system (DACS) including an attitude control system and a divert system in accordance with at least some embodiments.

FIG. 1 shows a conceptual diagram of one embodiment of a divert and attitude control system (DACS) 10. The DACS 10 may be used in a variety of ways and with a variety of flight systems or vehicles 11. In some embodiments, the DACS is included as part of a guided interceptor missile that is launched to destroy a target such as a ballistic missile; for example, the DACS may be used during the final stage of flight to maneuver a kinetic warhead (KW) into the target. The DACS may also be used for advanced upper stage booster divert and/or attitude control applications.

In one embodiment, the DACS 10 may be included as part of the standard missile 3 (SM-3) used in current missile defense systems; for example, the DACS 10 may be part of the final stage control system that maneuvers the KW into the target. The DACS 10 may also be used with any of the other stages of the SM-3; for example, the DACS 10 may be used with the third stage rocket motor of the SM-3 to perform divert and attitude adjustment maneuvers.

In some embodiments, the DACS 10 uses hot combustion gas to provide thrust for both divert and attitude adjustment maneuvers, which may be especially advantageous in the context of attitude adjustments. This type of system may provide a greater amount of thrust than conventional systems that use pressurized cold gas for attitude adjustments, which gas must be provided as a pre-pressurized container that is launched with the flight vehicle. Also, a hot gas system is safer to store, transport, and handle than high pressure containers.

In some embodiments, the DACS 10 generates and stores the hot gas. The pressures produced by this process may be significant. In one embodiment, the DACS 10 can withstand a maximum pressure of at least 1,000 psia, at least 1,500 psia, at least 2,000 psia, at least 2,500 psia, at least 3,000 psia, or at least 3,500 psia. In another embodiment, the DACS 10 is designed to withstand a maximum pressure of 1,000 to 3,500 psia, 1,500 psia to 3,000 psia, or 2,000 psia to 3,000 psia.

In some embodiments, the DACS 10 is a solid propellant divert and attitude control system (SDACS). In this embodiment, the DACS system 10 burns solid propellant to provide thrust for divert and attitude adjustment maneuvers. In general, it is preferable to use solid propellant because it is inherently safer to store, handle, and transport than liquid propellant.

In some embodiments, the solid propellant may be extinguishable. This makes it possible to repeatedly ignite and extinguish the propellant during operation, which increases the operational time of the DACS 10. In one embodiment, the solid propellant may be extinguished by sudden rapid depressurization. In another embodiment, the DACS 10 may be reignited at least 20 times during operation, at least 25 times during operation, or at least 30 times during operation.

The DACS 10 may operate for a relatively long period of time. The operational time of the DACS 10 is the period during which the DACS 10 can supply thrust for divert and attitude adjustment maneuvers. In general, it is desirable to maximize the operational time of the DACS 10 given the constraints of the particular flight vehicle. Long duration operation enables the flight vehicle to travel longer distances and operate with greater efficiency.

In one embodiment, the DACS 10 has an operational time of at least 100 seconds, at least 200 seconds, at least 300 seconds, at least 400 seconds, at least 500 seconds, at least 600 seconds, at least 700 seconds, at least 800 seconds, at least 900 seconds, or at least 1000 seconds. In another embodiment, the DACS 10 has an operational time of 100 to 2,000 seconds.

In one embodiment, the DACS 10 may use solid propellant and satisfy the specifications shown in Table 1.

TABLE 1

Solid DACS Specifications

| Parameter | Value |
| --- | --- |
| Operating Time | ≥300 seconds |
| Operating Mode | Extinguishable and/or throttling |
| Ignition Criteria | Hot gas storage is ≥500 psia within 0.5 seconds of ignition |

Referring back to FIG. 1, the DACS 10 includes an attitude control system 12 (alternatively referred to as an attitude control subsystem) and a divert system 14 (alternatively referred to as a divert subsystem). The attitude control system 10 includes an accumulator 16, a gas generator 18, an accumulator valve or first valve 20, a vent valve, extinguishment valve, or second valve 22, and one or more thrusters 24. The divert system 14 includes a divert valve or divert ignition valve 26 and divert components 28 such as divert thrusters and propellant.

Figure 2:
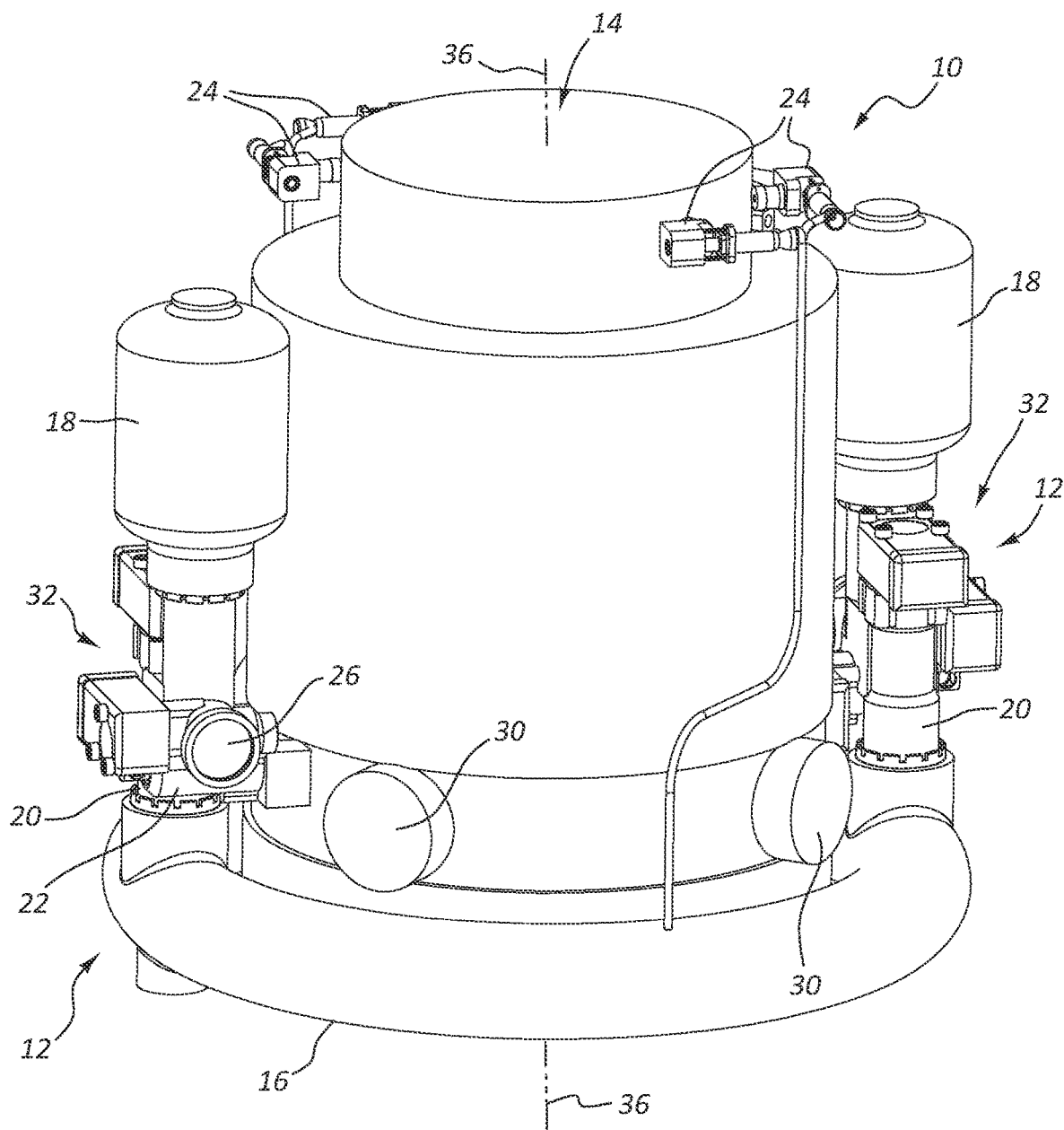
FIG. 2 is a perspective view of the DACS in FIG. 1 in accordance with at least some embodiments.
Figure 3:
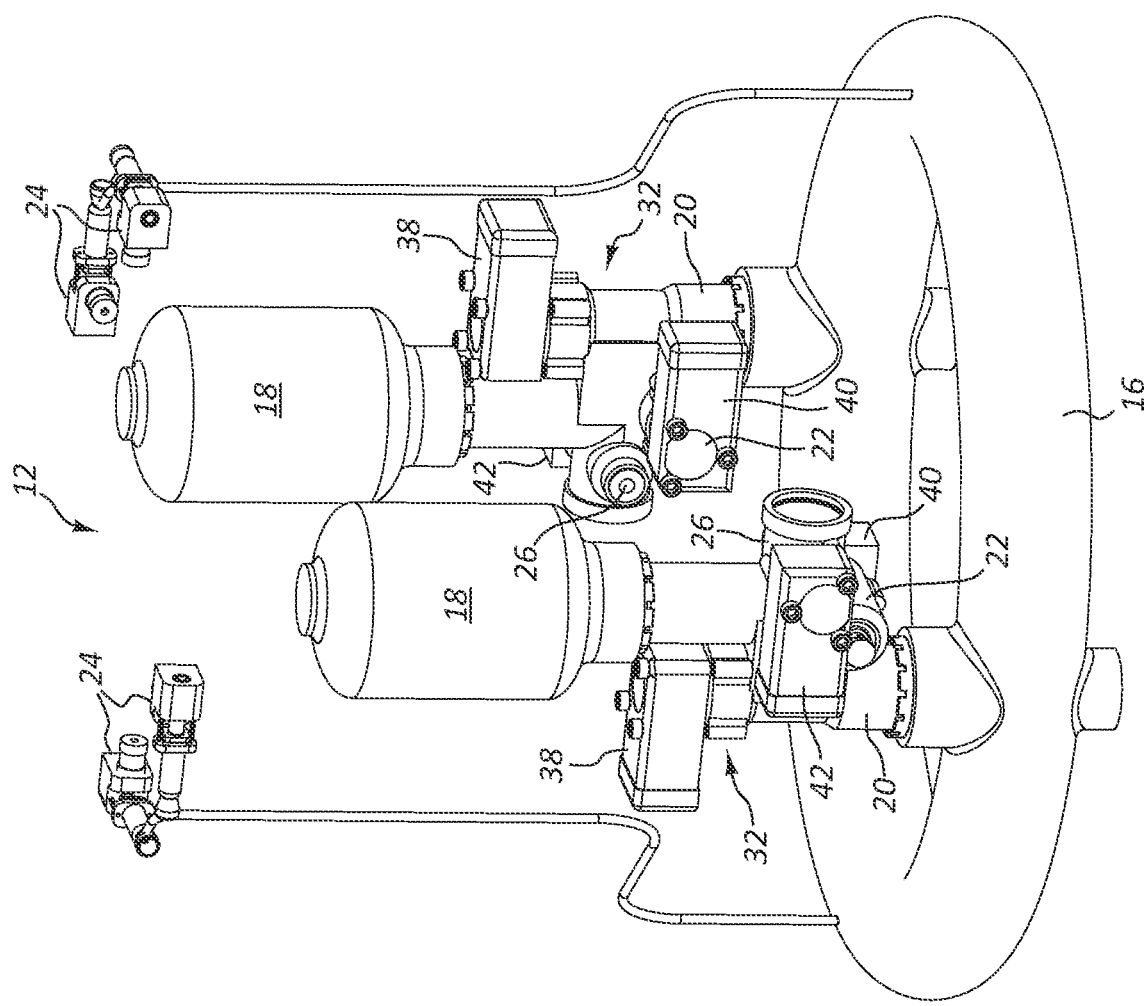
FIG. 3 is a perspective view of the attitude control system from the DACS in FIG. 2 in accordance with at least some embodiments.
Figure 4:
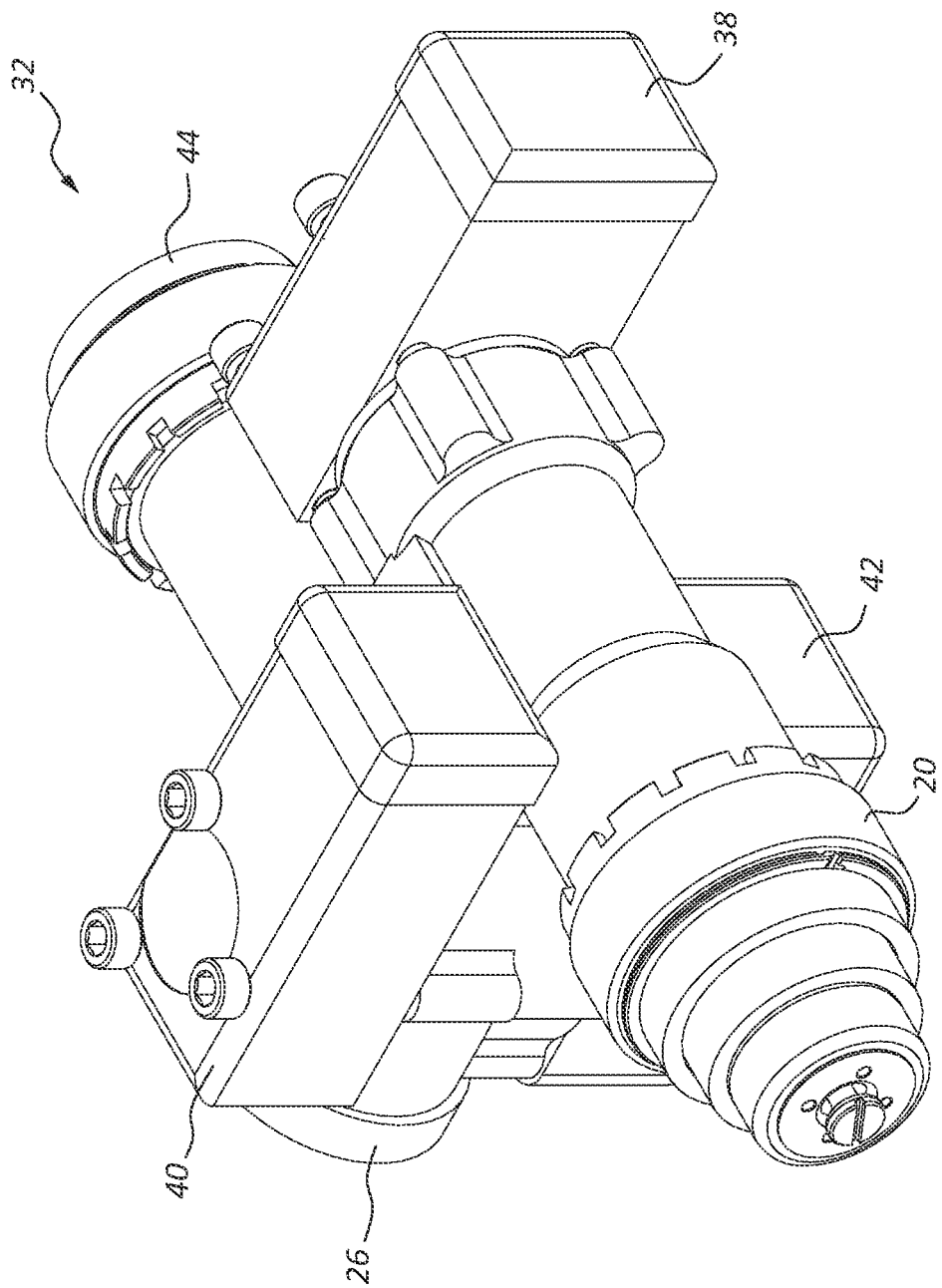
FIGS. 4-7 are perspective views of a housing assembly from the DACS in FIG. 2 in accordance with at least some embodiments.
Figure 5:
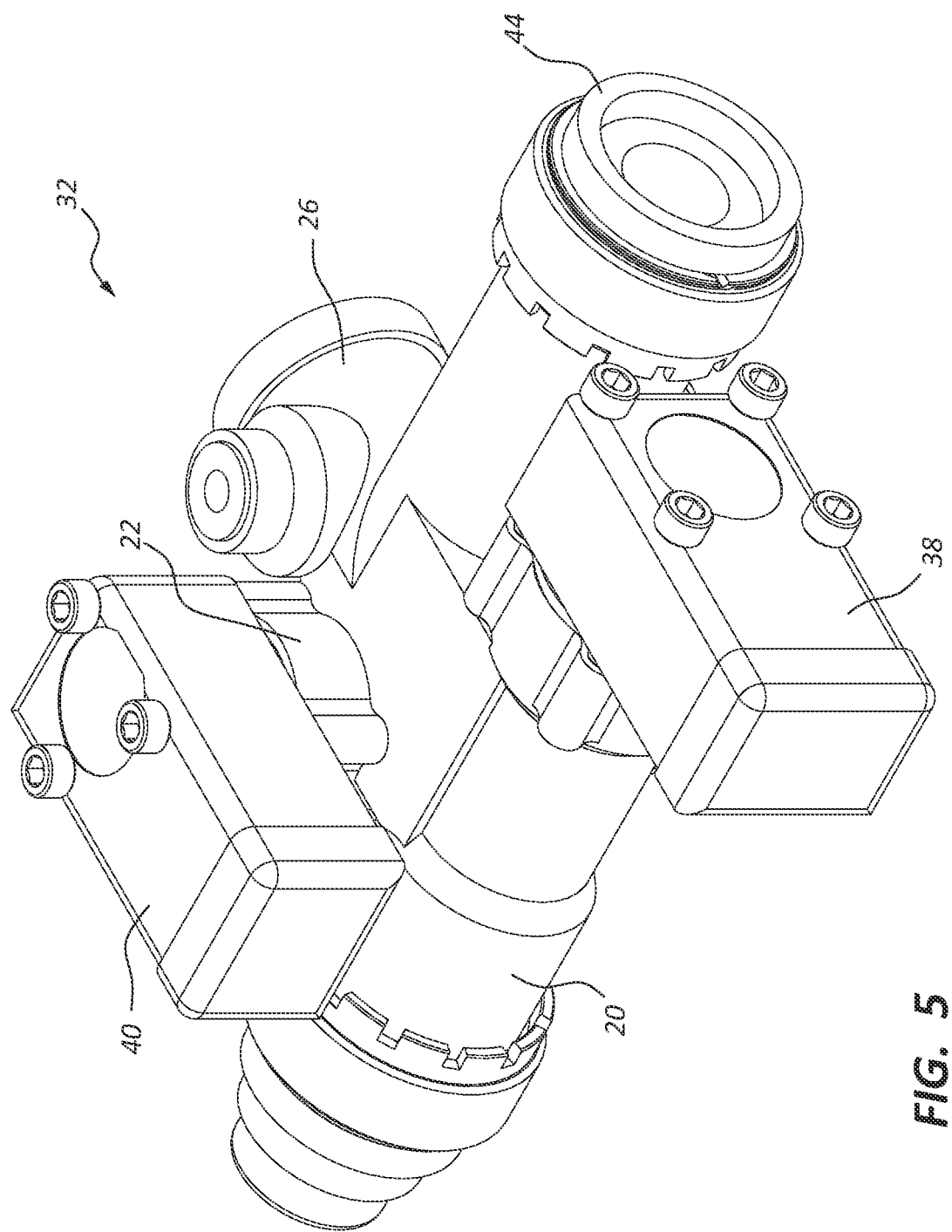
Figure 6:
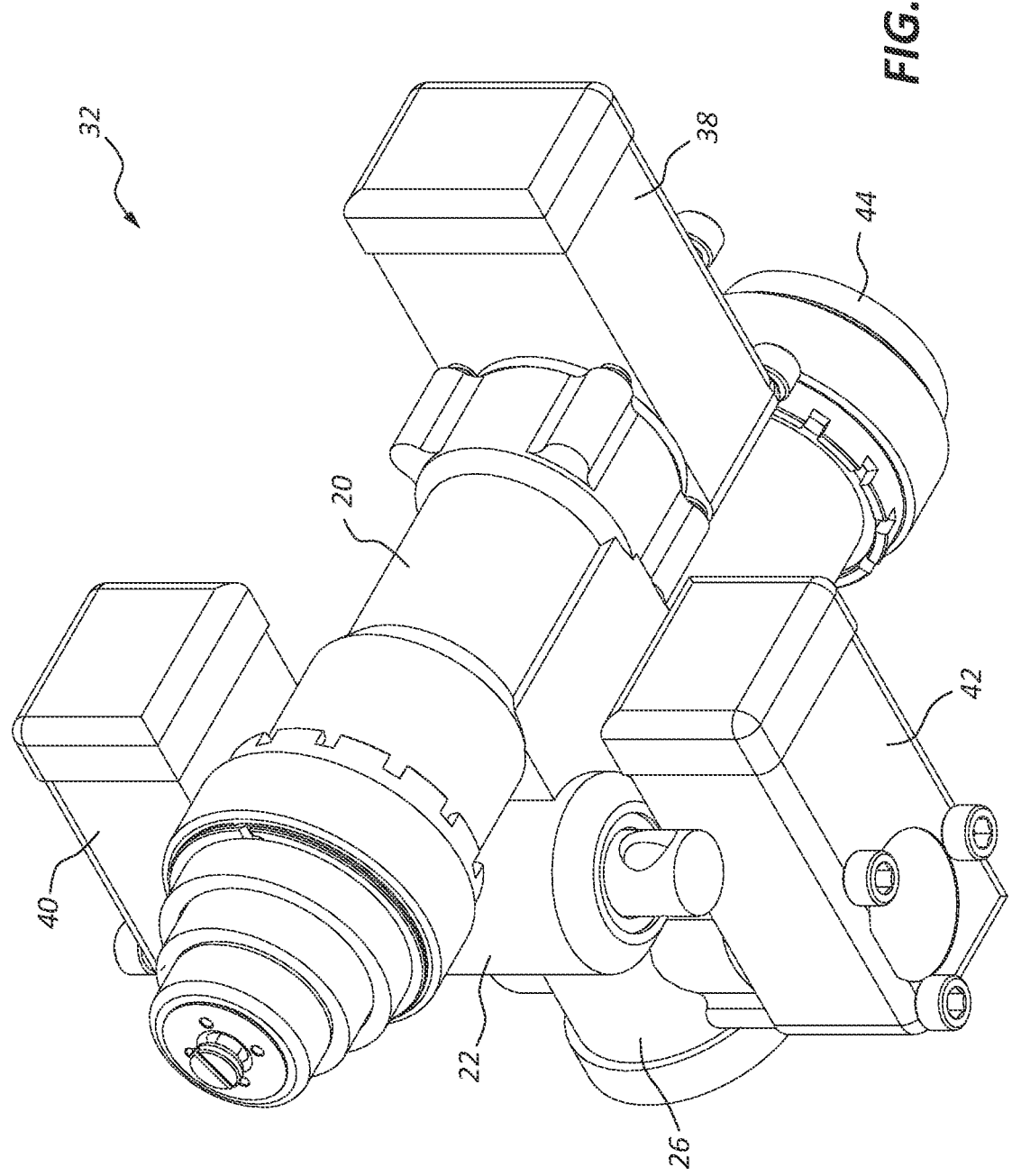
Figure 7:
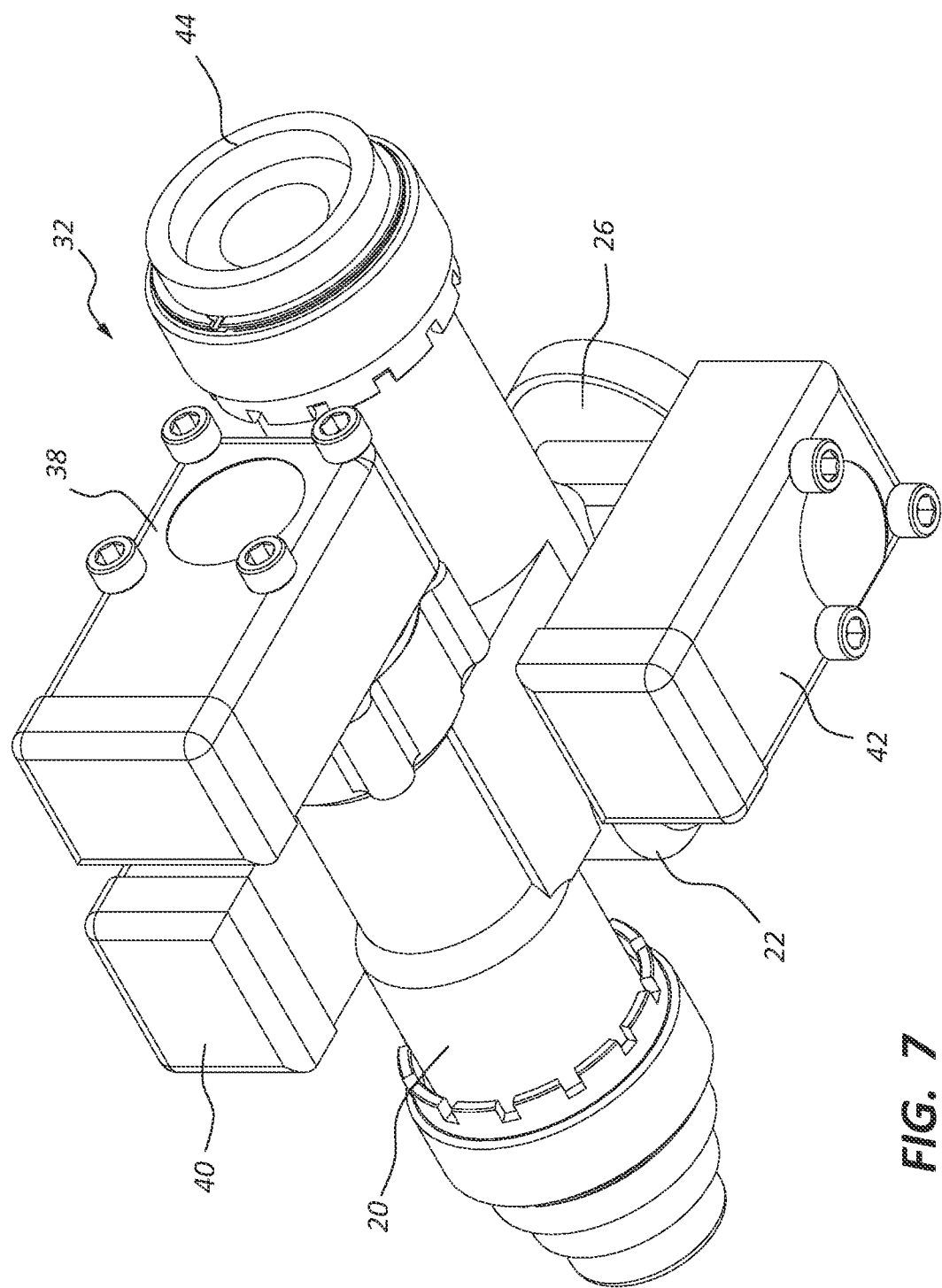
Figure 8:
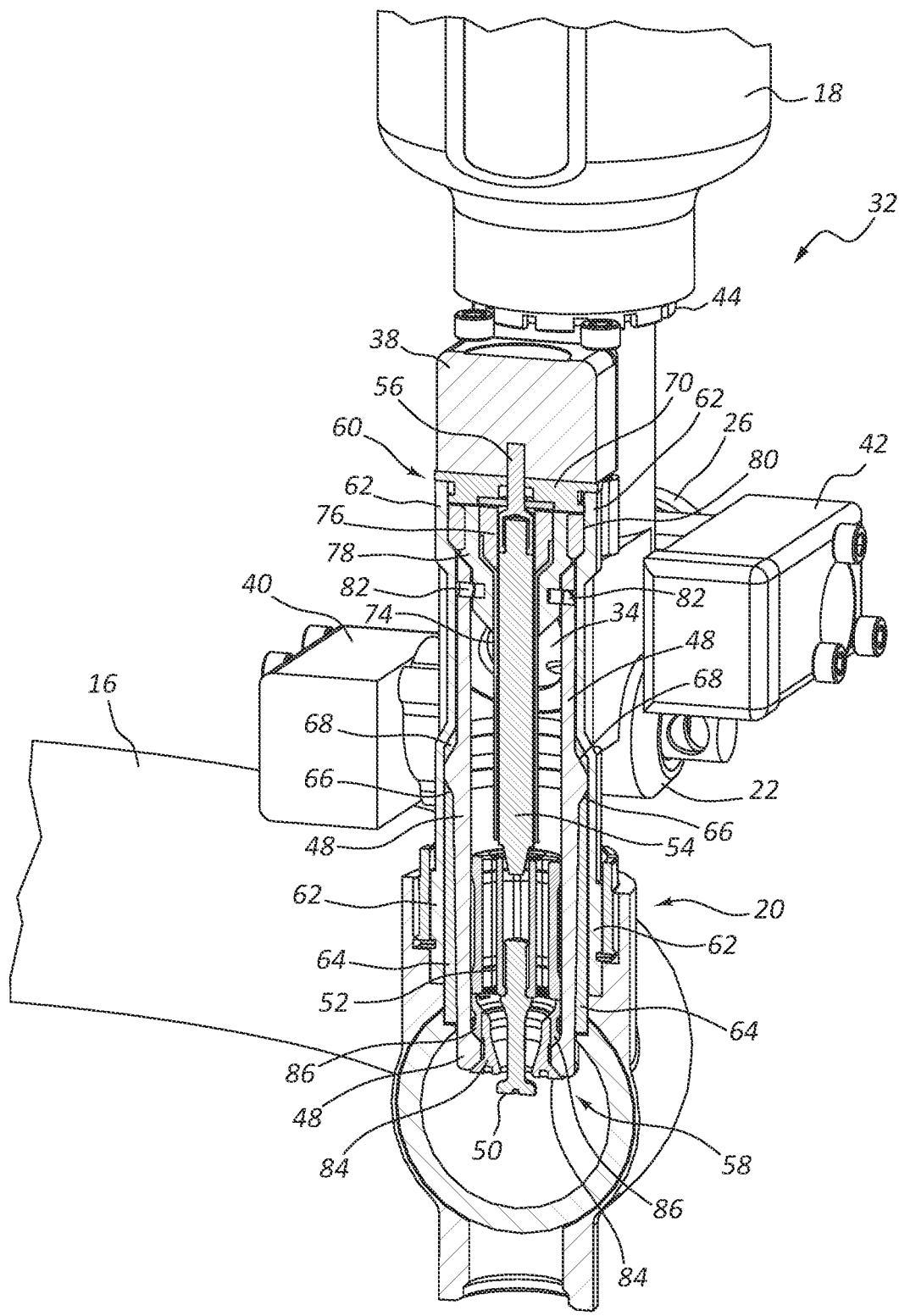
FIG. 8 is a cross sectional view of the attitude control system in accordance with at least some embodiments.
Figure 9:
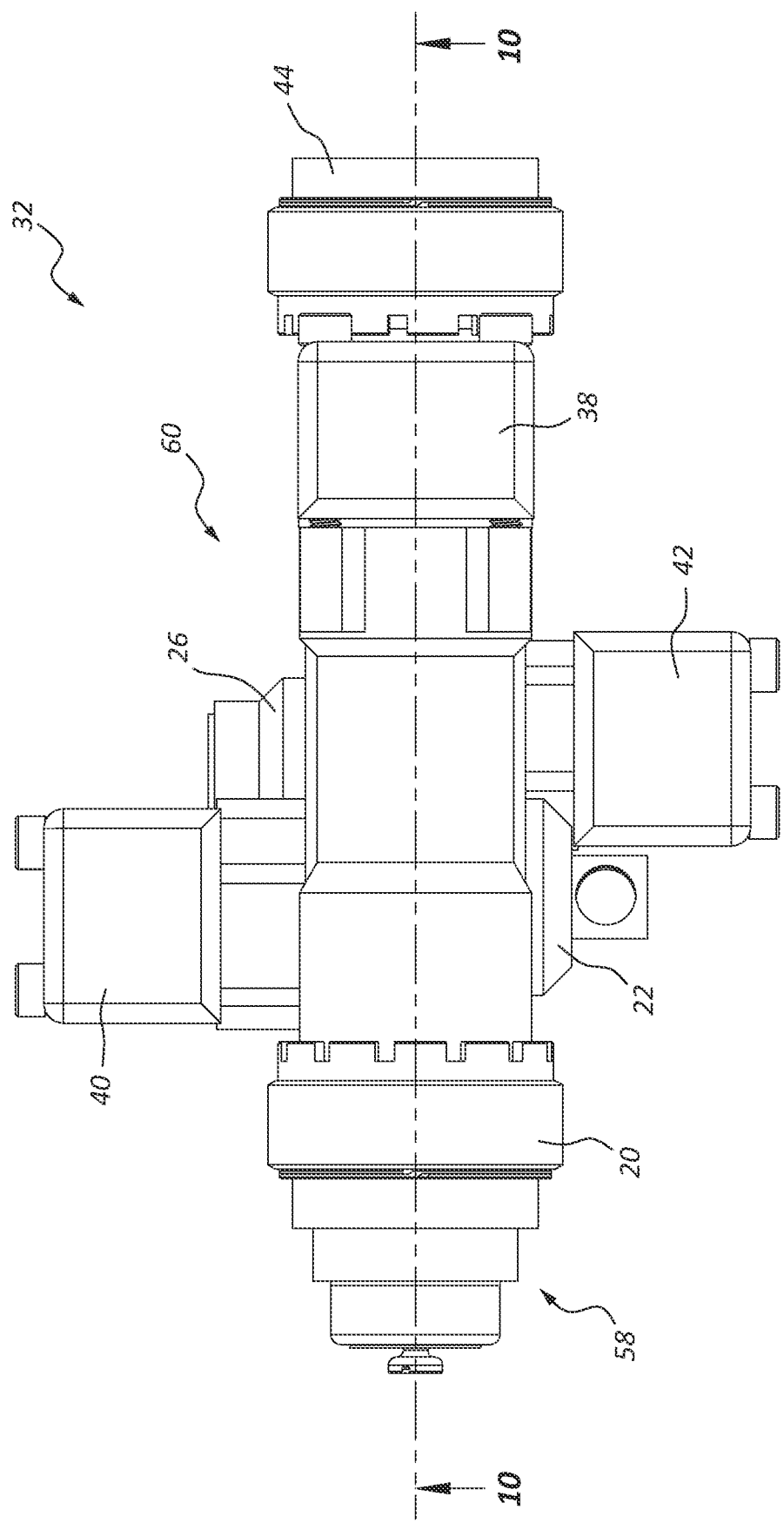
FIG. 9 is a side view of the housing assembly in FIGS. 4-7 in accordance with at least some embodiments.
Figure 10:
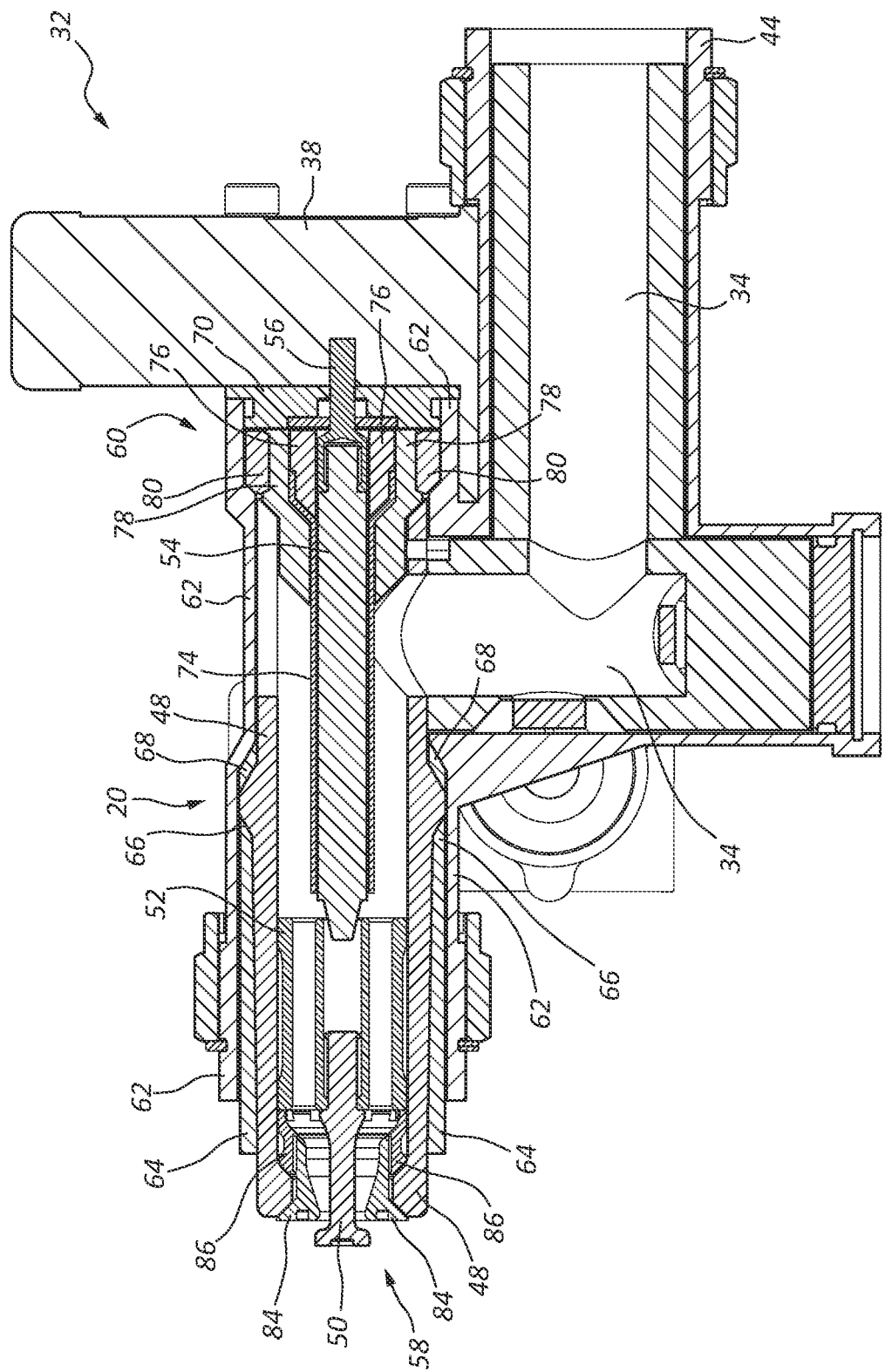
FIG. 10 is a cross sectional view of the housing assembly in FIG. 9 along line 10-10 in accordance with at least some embodiments.
Figure 11:
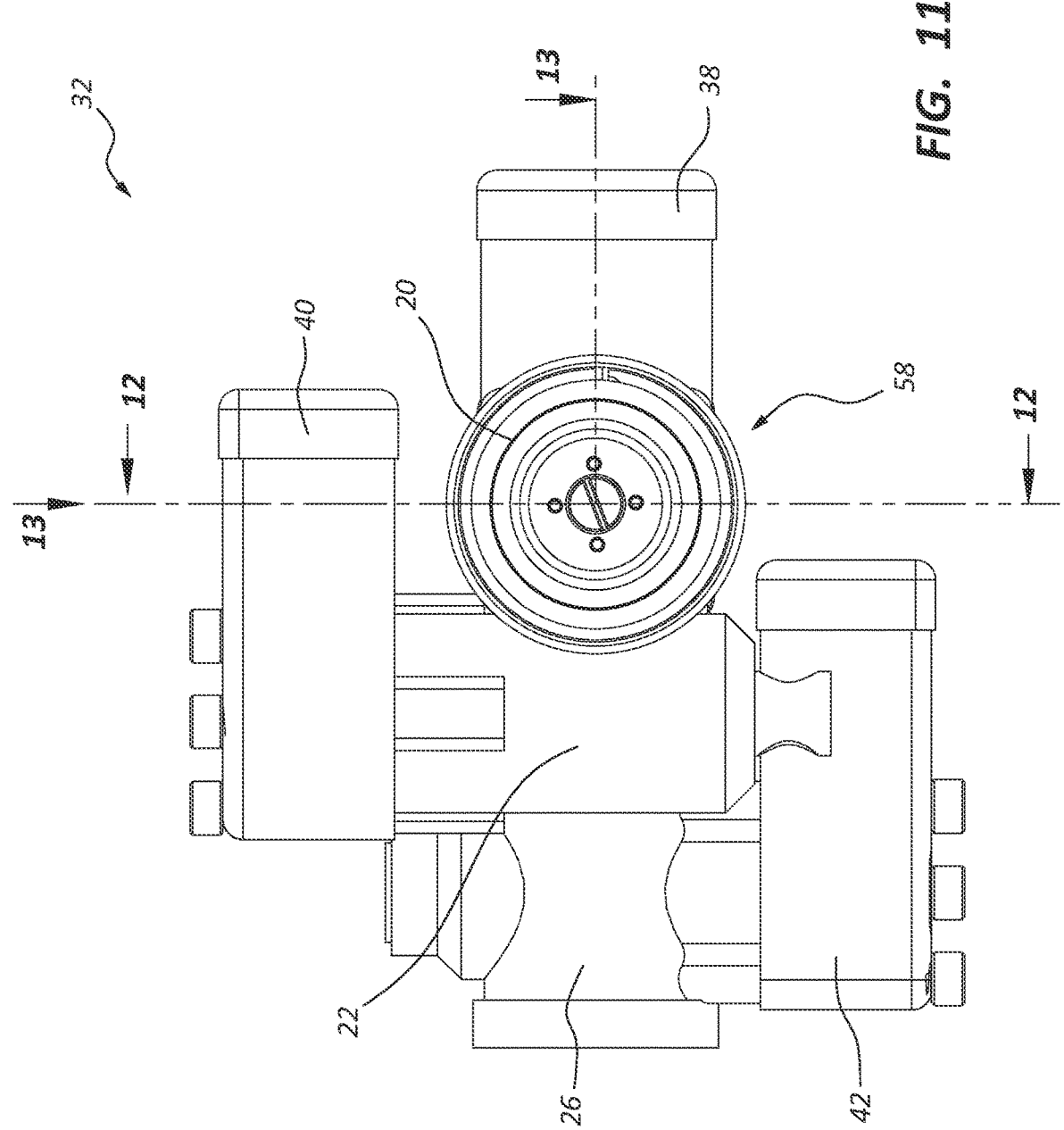
FIG. 11 is a bottom view of the housing assembly in FIGS. 4-7 in accordance with at least some embodiments.
Figure 12:
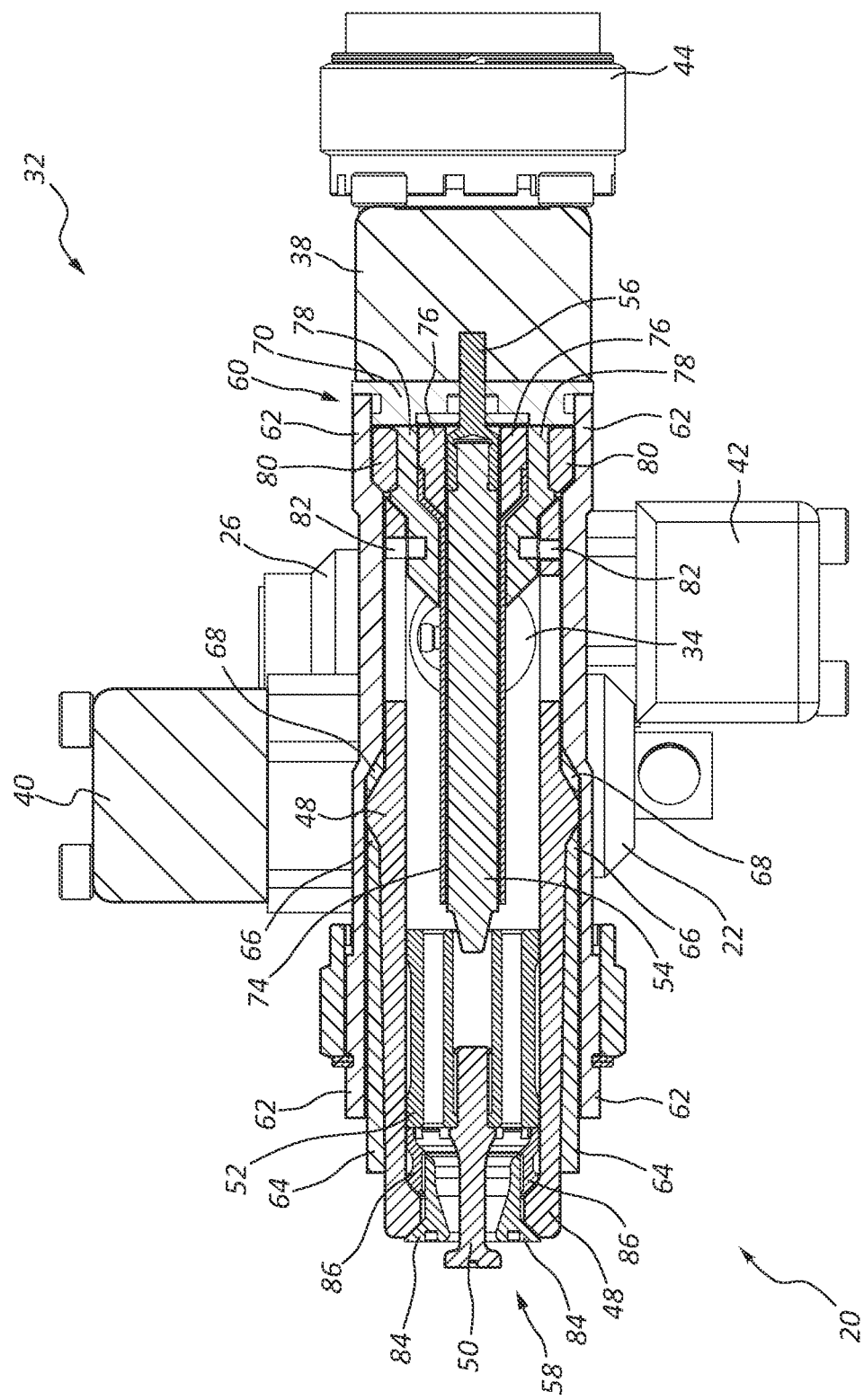
FIG. 12 is a cross sectional view of the housing assembly in FIG. 11 along line 12-12 in accordance with at least some embodiments.
Figure 13:
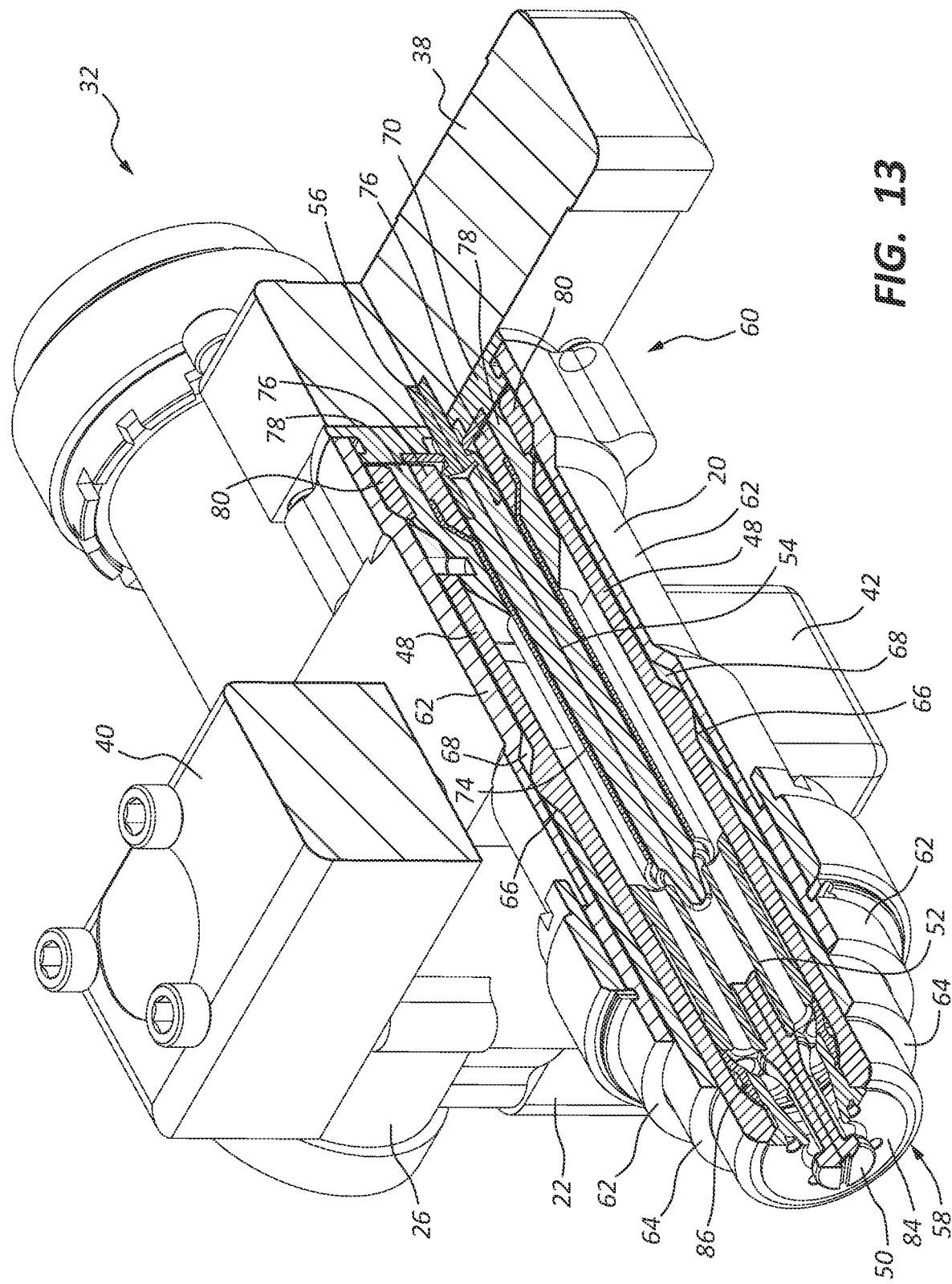
FIG. 13 is a cross sectional perspective view of the housing assembly in FIG. 11 along perpendicular lines 13-13 in accordance with at least some embodiments.

In some embodiments, the systems 12, 14 are physically separate units coupled together to form the DACS 10 as shown in FIG. 2. For example, each system 12, 14 may include its own propellant (not shown), thrusters 24, 30, and the like. In one embodiment, the systems 12, 14 are in fluid communication with each other so that hot gas from the attitude control system 10 may be used to ignite the propellant in the divert system 14 one or more times. The divert valve 26 can be used to control the flow of hot gas from the attitude control system 12 to the divert system 14.

It should be appreciated that the boundaries between the systems 12, 14 as depicted in the FIG. 1 are conceptual in nature and subject to change depending on the circumstances. For example, the divert valve 26 is shown as part of the divert system 14 in FIG. 1. However, the divert valve 26 could also be considered part of the attitude control system 12 if it is produced as part of the same unit that includes the components of the attitude control system 12. Alternatively, the divert valve 26 could be part of the unit that includes the components of the divert system 14.

It should be appreciated that divert maneuvers require more force than attitude adjustments. Accordingly, the divert system 14 is generally larger than the attitude control system 12. In one embodiment, the divert system 14 includes substantially more propellant than the attitude control system 12. For example, the divert system 14 may include 1.5× to 10× as much propellant, or more, as the attitude control system 12. The divert system 14 may also provide more total impulse than the attitude control system 12. For example, the divert system 14 may provide 1.5× to 10× as much total impulse, or more, than the attitude control system 12.

It should be appreciated that the divert system 14 may be any suitable system having any suitable configuration. The divert system 14 may be an off-the-shelf system that is adapted to work with the attitude control system 12 or the divert system may be developed from scratch for use with the attitude control system 12. Also, the divert system 14 may include any suitable amount of propellant and provide any desirable amount of total impulse for the flight vehicle.

One embodiment of the attitude control system 12 is shown in FIG. 2. The accumulator 16 has a circular or toroidal shape that encircles the base of the divert system 14. The attitude control system 12 includes a pair of housing assemblies 32 coupled to opposite sides of the accumulator 16. The housing assemblies 32 extend upward from the accumulator adjacent to the outside of the divert system 14. The upper end of each housing assembly 32 is coupled to a gas generator 18.

Each housing assembly 32 includes an accumulator valve 20, a vent valve 22, a divert valve 26, and one or more passages 34 connecting the gas generator 18 and the valves 20, 22, 26. The passages 34 enables hot gas to flow between the gas generator 18 and the valves 20, 22, 26. In this manner, the gas generator 18 and the valves 20, 22, 26 are in fluid communication with each other. Perspective views of the housing assembly 32 are shown in FIGS. 4-7.

The accumulator valve 20 controls the flow of hot gas between the gas generator 18 and the accumulator 16. The vent valve 22 is used to cause a rapid depressurization of the gas generator 18 to extinguish the propellant burning inside. The divert valve 26 is used to selectively enables hot gas to flow into the divert system 14 and ignite the propellant for divert maneuvers. The valves 20, 22, 26 are operated with actuators 38, 40, 42, respectively.

In general, it is desirable to provide a single accumulator 16 even though the attitude control system 12 may include more than one of the other components. The reason a single accumulator 16 is advantageous is because a single accumulator equalizes the pressure of the hot gas supplied to the thrusters 24. If two accumulators 16 were used, then the likelihood increases that the pressure in each accumulator 16 would be different, which could increase the variability of the thrust provided to individual thrusters 24.

Despite the advantages of a single accumulator 16, it should be appreciated that other embodiments can include multiple accumulators 16. For example, multiple accumulators 16 may be used if each accumulator is coupled to an independent set of thrusters that aren't designed to function together in a concerted manner.

In some embodiments, the attitude control system 12 is symmetrical along a lengthwise axis 36 of the flight vehicle. In the embodiment shown in FIG. 2, the lengthwise axis 36 is the axis going through the center of the accumulator 16 and the divert system 14. A symmetrical design is advantageous because the symmetrical design evenly distributes the weight of the attitude control system 12, which helps stabilize the flight vehicle during flight.

In some embodiments, the weight of the attitude control system 12 remains symmetrical throughout operation. The weight of the attitude control system 12 can change as propellant is burned in the gas generators 18. In the embodiment shown in FIG. 2, the propellant is distributed equally in the gas generators 18 so that as it burns, the center of gravity of the attitude control system 12 shifts forward along the lengthwise axis 36 but doesn't shift side to side.

It should be appreciated that the attitude control system 12 may have any suitable shape and/or configuration. For example, the accumulator 16 may have a cylindrical, hexagonal, or other shape. Also, the attitude control system 12 may include a single housing assembly 32 with a single gas generator 18, accumulator valve 20, vent valve 22, and divert valve 26. In other embodiments, the attitude control system 12 can include three or more housing assemblies 32 with a corresponding number of gas generators 18 and valves 20, 22, 26.

In some embodiments, the attitude control system 12 may withstand the same pressures and operate for the same amount of time as the DACS 10. In general, it should be appreciated that any individual parameter disclosed in connection with the DACS 10 also applies to the attitude control system 12. For example, if the DACS 10 can withstand a given pressure or temperature, then the attitude control system 12 can withstand the same pressure or temperature. Also, the operational times of the DACS 10 apply equally to the attitude control system 12.

In some embodiments, the attitude control system 12 is a stand-alone unit that can be used with any suitable divert system 14. The divert valve 26 may be considered part of the attitude control system 12 in these embodiments. The attitude control system 12 may be coupled to the divert system 14 and/or placed in fluid communication with the divert system 14 by connecting the divert valve 26 to the rest of the divert system 14. The stand-alone nature of the attitude control system 12 makes it flexible and easy to adapt to future divert systems 14 and flight vehicles.

The attitude control system 12 may operate in a variety of different ways. In some embodiments, the attitude control system 12 operates as follows: An initial charge of propellant or, in other words, a start grain of propellant is positioned in the accumulator 16. The accumulator valve 20 is closed to isolate the accumulator 16 from the other components in the attitude control system.

The initial charge is ignited to activate the attitude control system 12 and pressurize the accumulator 16. The amount of propellant in the initial charge is sufficient to pressurize the accumulator 16 above an initial set point or initial threshold. The initial set point can be any suitable minimal pressure level. In one embodiment, the initial charge pressurizes the accumulator 16 to at least 300 psia, at least 400 psia, at least 500 psia, or at least 600 psia.

Once the pressure in the accumulator 16 reaches the initial set point, the accumulator valve 20 is opened to enable the hot gas to flow through the passages 34 in the housing assembly 32 to the gas generator 18. The hot gas ignites the propellant in the gas generator 18, which causes the pressure to continue to rise in the housing assembly 32 and the accumulator 16 until the pressure reaches an upper threshold, maximum, or first set point. It should be noted that the vent valve 22 and the divert valve 26 are closed up to this point.

The maximum pressure may be set at any suitable amount. In one embodiment, the maximum pressure is no more than 4,000 psia, no more than 3,500 psia, no more than 3,000 psia, no more than 2,500 psia, or no more than 2,000 psia. When the pressure in the accumulator 16 reaches the maximum set point, the accumulator valve 20 is closed to keep the pressurized hot gas in the accumulator 16. At the same time, the vent valve 22 is opened to rapidly depressurize the gas generator 18 and extinguish the propellant. The vent valve 22 remains open until the accumulator 16 is recharged to ensure that the propellant is fully extinguished.

The accumulator 16 is now in a fully charged or fully pressurized condition. The hot gas in the accumulator 16 is released through the thrusters 24 as attitude adjustments are made to the flight vehicle. The accumulator 16 is recharged when a lower threshold or second set point is reached. The second set point can be a minimum pressure in the accumulator 16, a set amount of time since the last recharge, or both. In one embodiment, the accumulator 16 is recharged when either the pressure falls below a minimum level or a set amount of time has passed since the last recharge.

In some embodiments, the accumulator 16 is recharged when the pressure drops below 1,000 psia, below 750 psia, or below 500 psia. In other embodiments, the accumulator is recharged after 2 seconds, 3 seconds, 5 seconds, 10 seconds, 20 seconds, 30 seconds, 40 seconds, or 45 seconds.

In some embodiments, the accumulator 16 can be recharged more often at the beginning of the process to heat the system hardware up to operating temperature. In other words, the set amount of time between recharges can be lower initially and then increased as the system 12 heats up. The hardware absorbs heat from the hot gas. If the hardware absorbs too much heat, then the hot gas may not successfully ignite the propellant in the gas generator 18.

The accumulator 16 is recharged by closing the vent valve 22 and opening the accumulator valve 20. Hot gas from the accumulator 16 flows to the gas generator 18 and ignites the propellant. The process of pressurizing the accumulator 16 described above is repeated.

It should be appreciated that the accumulator 16 may be recharged many times during the operational life of the attitude control system 12. In some embodiments, the accumulator 16 is recharged at least 20 times, or at least 25 times. Repeatedly igniting and extinguishing the propellant in the gas generator 18 helps to extend the operational duration of the attitude control system 12.

In some embodiments, the attitude control system 12 may be used to repeatedly ignite the propellant in the divert system 14. This is done by opening the accumulator valve 20 and the divert valve 26 so that hot gas can flow from the accumulator 20 to the propellant in the divert system 14. The divert valve 26 may be closed after the propellant ignites or the divert valve may be left open to enable the propellant in the divert system 14 to recharge the accumulator 16.

The configuration of the attitude control system 12 provides a number of advantages. One advantage is that the attitude control system 12 only needs a single igniter for its entire operational life. One the accumulator 16 is initially pressurized, the hot gas contained in it can be used for all subsequent propellant ignitions in either or both of the attitude control system 12 and the divert and attitude control system 10. This is in contrast to conventional solid propellant systems, which require a separate igniter each time the propellant is reignited.

Another advantage is that the attitude control system 12 complies with MIL-STD-1901A, which is the safety criteria for the design of munition rocket and missile motor ignition systems. One of the reasons the design of the attitude control system 12 is compliant is because the igniter and initial charge of propellant are separated from the propellant in the gas generator 18 and the propellant in the divert system 14. This means that during storage and handling, the attitude control system 12 may be configured so that if the initial charge accidentally ignites the initial charge will not ignite the other propellant.

In one embodiment, the attitude control system 12 may be stored with the accumulator valve 20 and the vent valve 22 open. In this state, the hot gas produced by an accidental ignition of the initial charge is immediately vented through the vent valve 22. The hot gas cannot produce enough pressure to ignite the propellant in either the gas generator 18 or the divert system 14.

In another embodiment, the attitude control system 12 can be stored with the accumulator valve 20 closed and the thrusters 24 open. In this embodiment, the hot gas produced by an accidental ignition of the initial charge is immediately vented through the thrusters 24. In yet another embodiment, the attitude control system 12 can be stored with the accumulator valve 20, the vent valve 22 and the thrusters 24 open. Numerous other configurations are also possible.

In one embodiment, the attitude control system 12 is a low level attitude control system designed specifically for use with the SM-3 interceptor missile. For example, the attitude control system 12 may be used to adjust the attitude of the kinetic warhead during the final stage of flight just before it impacts the target.

In one embodiment, the kinetic warhead includes various sensors, transmitters, and/or receivers that allow warhead to send and receive information. For example, the sensors may be used to obtain information about the target from heat signatures, light emissions, radio wave emissions, and the like. In some embodiments, the sensors may be used to find and track the heat signature of the target. The attitude control system 12 may be used to adjust the attitude of the kinetic warhead to point the sensor directly at the target. The attitude control system 12 may be used in numerous other ways as well.

In some embodiments, the attitude control system 12 may be a small compact system that is limited in the amount of total impulse the system can provide. For example, the system may be configured to provide no more than 800 lbf-sec of impulse, no more than 600 lbf-sec of impulse, no more than 400 lbf-sec of total impulse, or no more than 300 lbf-sec of total impulse.

In one embodiment, the low level attitude control system satisfies one or more of the specifications in Table 2 below. A low level attitude control systems meeting these requirements may be especially suitable for use with the SM-3's kinetic warhead.

TABLE 2

Low Level Attitude Control System Specifications

| Parameter | Value |
|---|---|
| Min. pressure | 500 psia |
| Nominal max. pressure | 3,000 psia |
| Recharge cycles | ≥28 |
| Max. expected operating pressure (MEOP) | 3,500 psia |
| Structural factors of safety at MEOP | $FS_{ULT}$ 1.25; $FS_{YLD}$ = 1.10; $FX_{PRF}$ = 1.0 |
| Configuration/layout | Common accumulator; dual gas generators and housing assemblies |
| Delivered total low level impulse | ≥200 lbf-sec (≥100 lbf-sec per accumulator valve) |
| Thruster(s) inlet temperature | ≤2000° F. |
| SDACS ignition capability | Pressurize 200 in³ volume to ≥500 psia in ≤0.5 sec. |
| System weight | ≤10 lbm |
| Propellant type | Extinguishable |
| Ignition system safety | MIL-STD-1901A compliant |

Each of the components of the attitude control system 12 are described in greater detail as follows. The components may be off-the-shelf parts or custom manufactured for a specific application. The components that are subject to the most extreme conditions are more likely to be custom manufactured.

The accumulator 16 may have any suitable configuration. In general, the accumulator 16 is in the form of an enclosure capable of holding the hot gas generated by the burning propellant. The accumulator 16 may have a variety of shapes including those described previously. The accumulator 16 may also have any number and variety of interface ports.

The accumulator 16 may have any suitable amount of internal free volume. A larger amount of free volume means that the accumulator 16 does not need to be recharged as often; however, it also means that the accumulator 16 weighs more. Thus, there is a trade-off between internal free volume and weight. In one embodiment, the accumulator 16 includes at least 20 in³ of internal free volume, at least 25 in³ of internal free volume, at least 30 in³ of internal free volume, at least 35 in³ of internal free volume, at least 40 in³ of internal free volume, at least 45 in³ of internal free volume, or at least 50 in³ of internal free volume.

The accumulator 16 may be made of any suitable material that is capable of withstanding the high temperatures and high pressures produced by the hot gas. In some embodiments, the accumulator 16 is made of stainless steel or a stainless steel alloy. For example, the accumulator 16 can be made of 17-4 H1150 stainless steel alloy. In other embodiments, the accumulator 16 may be made of titanium.

In one embodiment, the accumulator 16 satisfies one or more of the specifications set forth below in Table 3. This design of the accumulator 16 may be especially suitable for use with a low level attitude control system.

TABLE 3

Accumulator Specifications

| Parameter | Value |
|---|---|
| Internal free volume | ≥50 in³ |
| Configuration | Toroidal |
| Interface ports | 2× valve ports; 2× igniters; 2× thruster outlets, 1× pressure transducer |
| Operating pressure/MEOP | 500 to 3,000 psia/3,500 psia |
| Factors of safety at MEOP | $FS_{ULT}$ = 1.25; $FS_{YLD}$ = 1.10; $FX_{PRF}$ = 1.0 |

The gas generator 18 is coupled to a top or first end 44 of the housing assembly 32. In general, the gas generator 18 is a container configured to hold the propellant during storage and operation of the attitude control system 12. It should be appreciated that the gas generator 18 can have any suitable size and shape.

In some embodiments, the gas generator 18 is a cylindrical canister. One end of the canister is coupled to the top end 44 of the housing assembly 32. In other embodiments, the gas generator 18 may have a spherical, hexagonal, or other shape. The gas generator 18 may be made of any suitable material. In general, the gas generator 18 should be capable of withstanding the temperatures and pressures associated with combustion of the propellant. In some embodiments, the gas generator 18 may be made of the same material as the accumulator 16.

The gas generator 18 may include any type of propellant. In one embodiment, the propellant is solid propellant. In another embodiment, the propellant is extinguishable. In yet another embodiment, the propellant is an extinguishable, solid propellant. The propellant may be purchased commercially as an off-the-shelf product or custom designed for use with the gas generator 18.

In one embodiment, the gas generator 18 satisfies one or more of the specifications set forth below in Table 4. This design of the gas generator 18 may be especially suitable for use with a low level attitude control system.

TABLE 4

Gas Generator Specifications

| Parameter | Value |
| --- | --- |
| Max. propellant grain diameter | 2.6 inches |
| Internal free volume | $\geq 2$ in$^3$ (includes plumbing) |
| Propellant type | Extinguishable |
| Operating pressure/MEOP | 500 to 3,000 psia/3,500 psia |
| Factors of safety at MEOP | FS$_{ULT}$ = 1.25; FS$_{YLD}$ = 1.10; FX$_{PRF}$ = 1.0 |

The accumulator valve 20 moves between an open position where hot gas can flow into and out of the accumulator 16 and a closed position where hot gas is prevented from flowing into and out of the accumulator 16. The accumulator valve 20 is shown in the open position in FIGS. 8, 10, and 12-13.

The accumulator valve 20 is subject to some of the harshest conditions in the attitude control system 12. The accumulator valve is one of the few components that is subjected to high temperatures and high pressures for the entire duration of the operation of the attitude control system 12. Most of the other components have an opportunity to cool off at one point or another. The high temperatures and high pressures place a tremendous amount of stress and strain on the accumulator valve 20.

It should be appreciated that in some embodiments, the accumulator valve 20 may be an off-the-shelf valve or may be adapted from an off-the-shelf valve. For example, an off-the-shelf valve may be suitable for situations having relatively lower temperatures and pressures and when the attitude control system 12 is not a mission critical component. In other embodiments, the accumulator valve 20 may be custom designed for the specific application.

The accumulator valve 20 seals the accumulator 16 shut between recharge cycles. The accumulator valve 20 should not leak more than a minor or insubstantial amount. If the accumulator valve 20 leaks more than this, then the accumulator 16 will need to be recharged more often and the gas generator 18 will need to be enlarged to hold more propellant, both of which are undesirable.

FIGS. 8-13 show various cross sectional views of the accumulator valve 20. The accumulator valve 20 also includes a poppet 50, a poppet guide 52, a valve shaft 54, and a valve shaft adapter 56. These components move lengthwise (axially) inside the accumulator valve 20 to open and close it.

The accumulator valve 20 includes a first or proximal end 58 and a second or distal end 60. The accumulator valve 20 includes an actuator seal plate 70 positioned at the second end 60. The actuator 38 is coupled to the actuator seal plate 70. The actuator seal plate 70 prevents the hot gas from escaping through the second end 60 of the accumulator valve 20.

The actuator 38 engages the valve shaft adapter 56 at the second end 60 of the accumulator valve 20. The actuator 38 opens the accumulator valve 20 by pushing the valve shaft 54 lengthwise towards the first end 58. The valve shaft 54 contacts and pushes the poppet guide 52 lengthwise, which, in turn, pushes the poppet 50 open. In one embodiment, the poppet 50 is coupled to and moves in tandem with the poppet guide 52.

In some embodiments, the only way to close the accumulator valve 20 is with the force of the pressure in the accumulator 16. The actuator 38 only opens the accumulator valve 20; the actuator does not close the accumulator valve.

After the initial charge has pressurized the accumulator 16, the actuator 38 opens the accumulator valve 20 to allow hot gas to flow to the gas generator 18. In this state, the pressure is highest in the accumulator 16 and lowest in the gas generator 18 creating a pressure gradient from the former to the latter. The actuator 38 holds the accumulator valve 20 open as the hot gas flows from the accumulator 16 to the gas generator 18.

When the propellant ignites, the pressure gradient reverses so that the pressure is higher in the gas generator 18 than in the accumulator 16 and the hot gas begins flowing the opposite direction. The actuator 38 no longer holds the accumulator valve 20 open. Instead, the flow of hot gas holds the accumulator valve open. When the accumulator 16 is fully recharged, the vent valve 22 opens causing the pressure gradient to reverse again. Hot gas flows from accumulator 16 to the vent valve 22. The actuator 38 moves the valve shaft 54 lengthwise back towards the second end 60 of the accumulator valve 20 and the flow of hot gas pushes the poppet 50 closed.

In one embodiment, the valve shaft 54 only contacts the poppet guide 52 when the accumulator valve 20 is open. When the valve shaft is closed, the valve shaft 54 is retracted towards the second end 60 of the accumulator valve 20 far enough that the valve shaft no longer contacts the poppet guide 52. This provides a thermal break between the valve shaft and the poppet guide 52, which reduces the heat load on the actuator 38 thereby extending its useful life.

It should be appreciated that the poppet 50, poppet guide 52, valve shaft 54, and valve shaft adapter 56 may be made of any suitable material. All of these components are subjected to high temperatures, especially the first three, and should be made of materials that are capable of withstanding the temperatures. In some embodiments, the poppet 50 may be made of rhenium molybdenum and the poppet guide 52 and the valve shaft 54 may be made of a ceramic matrix composite.

In some embodiments, the accumulator valve 20 includes a shield or shaft shield 74 that surrounds the valve shaft 54. The shield 74 may be made of any suitable high temperature resistant material such as rhenium molybdenum.

The accumulator valve 20 includes a main body 48 through which the hot gas flows. The main body 48 is positioned in a valve housing 62. A layer of main body insulation 64 is provided between the valve housing 62 and main body 48 near the first end 58 of the accumulator valve 20. This is the area that gets the hottest. The main body insulation 64 prevents heat transfer from the main body 48 to the valve housing 62. In one embodiment, the accumulator valve 20 is designed to prevent the valve housing 62 from exceeding a temperature of 1,000° F.

In one embodiment, the area 66 where the distal end of the main body insulation 64 and the main body 48 meet is tapered to reduce the stress produced when the main body insulation 64 expands due to the heat. Another insulating component or insulating washer 68 is provided just slightly distal of the area 66 to reduce the heat transfer and seal the interface between the main body 48 and the valve housing 62 at this location.

It should be appreciated that the main body 48, valve housing 62, main body insulation 64, and insulating component 68 may be made of any suitable materials. In some embodiments, the main body 48 is made of the same ceramic matrix composite material as the poppet guide 52 and valve shaft 54. The valve housing 62 may be made of a light, durable metal such as titanium.

The insulation 64 may be any suitable material that significantly inhibits heat transfer from the main body 48 to the valve housing 62. In one embodiment, the insulation 64 is ethylene propylene diene monomer (M-class) rubber (EPDM). The insulating component 68 may also be made of any suitable material that significantly inhibits heat transfer from the main body 48 to the valve housing 62. In one embodiment, the insulating component 68 may be made of silica-phenolic material.

As already mentioned, in some embodiments, the main body 48, the poppet guide 52, and the valve shaft 54 are made of a ceramic matrix composite material. Any suitable ceramic matrix composite materials may be used. In one embodiment, the main body 48, the poppet guide 52, and the valve shaft 54 are made of carbon zirconium oxide carbide (C—ZrOC) and/or carbon silicon carbide (C—SiC).

Figure 14B:
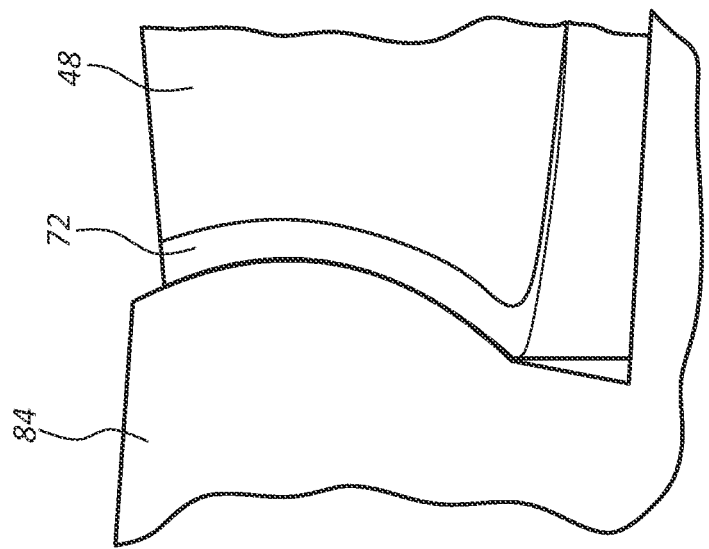
FIGS. 14A-14B are perspective views of a throat area of the accumulator valve in accordance with at least some embodiments.
Figure 14A:
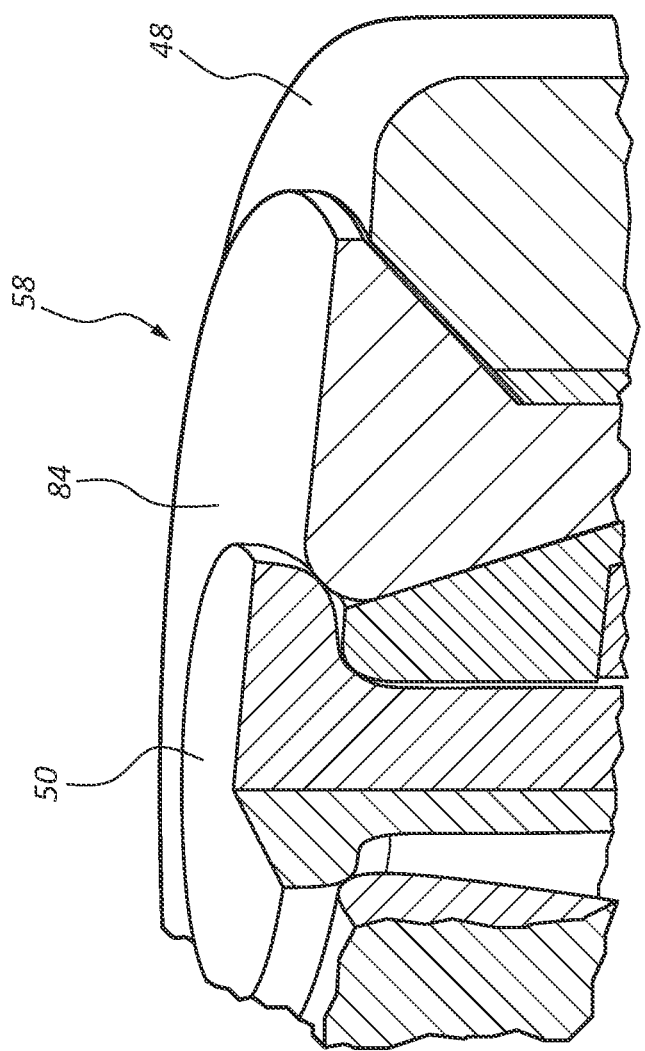

Ceramic matrix composites are inherently porous. Those components that are under pressure, such as the main body 48, may leak hot gas through the ceramic matrix composite. In some embodiments, the ceramic matrix composites may be coated with a seal coating 72 (FIG. 14). For example, the main body 48 may be coated on the inside and outside surface with a seal coating 72. Any suitable material may be used for the seal coating. In one embodiment, the seal coating is a thin coating of silicon carbide (SiC).

Ceramic matrix composite materials are excellent structural insulators. They exhibit structural strength over extreme temperatures while also providing great insulator properties. They also dimensionally stable over a wide temperature range. The ceramic matrix materials with the best properties for use in the accumulator valve 20 are C—ZrOC and C—SiC.

Ceramic matrix composites are a subgroup of composite materials as well as a subgroup of technical ceramics. They consist of ceramic fibers embedded in a ceramic matrix, thus forming a ceramic fiber reinforced ceramic material. The matrix and fibers can consist of any ceramic material, whereby carbon and carbon fibers can also be considered a ceramic material. In general, the names of ceramic matrix composites include a combination of the type of fiber/type of matrix. For example, C—C stands for carbon-fiber-reinforced carbon (carbon/carbon), or C—SiC for carbon-fiber-reinforced silicon carbide.

Ceramic matrix composites are typically manufactured using the following three step process. The first step is to lay-up and fixate the fibers shaped as the desired component. The second step is to infiltrate the fibers with the matrix material. The third step is machining the component and, if required, further treatments like coating or impregnation of the intrinsic porosity.

The first and the last step are almost the same for all ceramic matrix composites: In step one, the fibers, often called rovings, are arranged and fixed using techniques used in fiber-reinforced plastic materials, such as lay-up of fabrics, curtain needled, filament winding, braiding, and knotting. The result of this procedure is called fiber-preform or simply preform.

For the second step, five different procedures can be used alone or in combination with each other to fill the ceramic matrix in between the fibers of the preform: (1) deposition out of a gas mixture, (2) pyrolysis of a pre-ceramic polymer, (3) chemical reaction of elements, (4) sintering at a relatively low temperature in the range 1000-1200° C., and/or (5) electrophoretic deposition of a ceramic powder. Procedures one, two and three find applications with non-oxide ceramic matrix composites, whereas the fourth one is used for oxide ceramic matrix composites. It should be appreciated that all of these procedures have sub-variations, which differ in technical details.

The third and final step of machining—grinding, drilling, lapping or milling—is typically done with diamond tools. Ceramic matrix composites can also be processed with a water jet, laser, or ultrasonic machining.

In some embodiments, the main body 48, the poppet guide 52, and the valve shaft 54 are made using a braided preform. The braided preform provides greater strength per mass versus other preforms such as curtain needled preforms. For example, the wall thickness of the main body 48 may be reduced by half or more while still maintaining the same pressure rating when a braided preform is used versus a curtain needled preform.

The braided structure provides greater strength because the fibers can be oriented in the desired manner with minimal cutting. In contrast, the fibers in a curtain needled preform are cut in a Cartesian orientation to fabricate a circular component. Cutting the fibers in this manner reduces the strength and pressure rating of the resulting ceramic matrix composite. In some embodiments, the main body 48, the poppet guide 52, and the valve shaft 54 can be made of C—ZrOC or C—SiC ceramic matrix composites manufactured using a braided preform.

Referring back to FIG. 8, the accumulator valve 20 may be coupled to the accumulator 16 in such a manner that part of the accumulator valve 20 extends into the accumulator 16. This configuration is advantageous because it reduces the overall weight and profile of the attitude control system 12.

In some embodiments, the main body 48 extends into the accumulator 16. When the accumulator 16 is recharged, the main body 48 is pressurized with hot gas. In this state, the main body 48 functions as a pressure vessel. When the accumulator 16 is full and the vent valve 22 is opened, the pressure inside the main body 48 drops to ambient. In this state, the portion of the main body 48 that extends into the accumulator 16 is under hoop compression by the pressurized gas in the accumulator 16.

In some embodiments, the valve shaft 54 can be held in place at the second end 60 of the accumulator valve 20 by a first spacer 76, a second spacer 78, and a nut 80. The second spacer 78 is coupled to the main body 48 using radial pins 82. The nut 80 can be a castlenut that engages threads on the outside of the second spacer 78. As the nut 80 is tightened, it bears down on the valve housing 62 and pulls the second spacer 78 and main body 48 towards the second end 60 of the accumulator valve 20 thereby compressing the insulating component 68.

It should be appreciated that the spacers 76, 78 may be made of any suitable material. In one embodiment, the spacers 76, 78 are made of an insulating material that inhibits heat transfer to the actuator 38. For example, the spacers 76, 78 may be made of a silica phenolic material and/or a carbo phenolic material.

The accumulator valve 20 includes a throat 84 and a throat retainer 86. The poppet 50 contacts the throat 84 to close the accumulator valve 20. The throat 84 is coupled to the main body 48 at the first end 58 of the accumulator valve 20. The main body 48 includes a narrow section in this area and the throat 84 and throat retainer 86 are positioned on opposite sides of the narrow section of the main body 48 with the throat 84 on the exterior side and the throat retainer 86 on the interior side. The throat retainer 86 is coupled to the throat 84 so that the narrow section of the main body 48 is sandwiched in between.

It should be appreciated that the throat 84 and the throat retainer 86 may be coupled together in any suitable manner. In one embodiment, the throat 84 and the throat retainer 86 are coupled together using threads. The threads may be oriented in such a way that when the throat 84 and the throat retainer 86 are heated, the threads tighten and form a seal that prevents gas from escaping between the throat 84 and main body 48.

It should be appreciated that the throat 84 and the throat retainer 86 may be made of any suitable materials. In one embodiment, the throat 84 and the throat retainer 86 may be made of a material that is capable of withstanding high operating temperatures and high velocity gas flows. For example, the throat 84 and the throat retainer 86 may be made of rhenium molybdenum and/or molybdenum.

Referring to FIG. 14, the interface between the throat 84 and the main body 48 is shown. This is one of the areas that may potentially leak if these two surfaces do not form an adequate seal. One of the difficulties with this interface is that the throat 84 typically has a much higher modulus than the main body 48, which means that the surface of the main body 48 will conform to the surface of the throat 84. In one embodiment, a slight radius of curvature is provided on the backside of the throat 84 to form a corresponding curve on the main body 48. This configuration effectively seals the interface between these two components.

In one embodiment, the accumulator valve 20 satisfies one or more of the specifications set forth below in Table 5. This design of the accumulator valve 20 may be especially suitable for use with a low level attitude control system.

TABLE 5

Accumulator Valve Specifications

| Parameter | Value |
|---|---|
| Contraction ratio | Min. 3:1 relative to propellant grain |
| Natural throat area | Scaled to ≥1.1× operational throat |
| Permissible leak rate | TBD |
| Response time | ≥2 inches/sec to 90% full stroke |
| Max. total stroke | ≤0.300 inches |
| Duty cycle | ≥28 close/open/close cycles; random operation over 300 seconds. |

Figure 15:
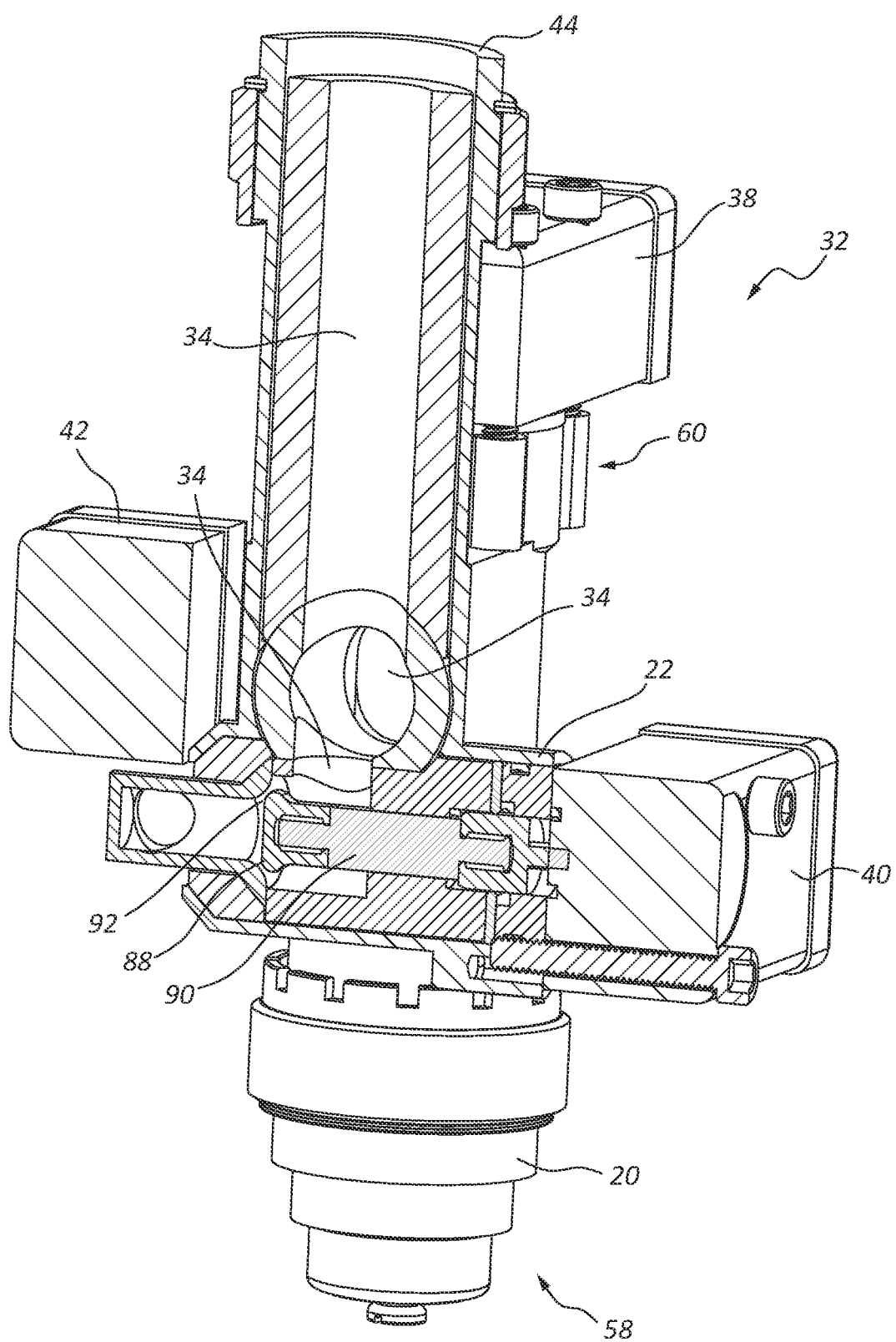
FIG. 15 is a cross sectional perspective view of the vent valve in accordance with at least some embodiments.

Referring to FIG. 15, one embodiment of the vent valve 22 is shown. The vent valve 22 includes many of the same components as the actuator valve 20. For example, the vent valve 22 includes a poppet 88, valve shaft 90, and throat 92. The vent valve 22 moves between an open position where the poppet 88 is spaced apart from throat 92 and a closed position where the poppet 88 is in contact with the throat 92. In one embodiment, the actuator 40 moves the valve shaft 90 lengthwise to move the poppet 88 between the open and closed position.

It should be appreciated that the components in the vent valve 22 may be made of any suitable material including those already mentioned above in connection with the accumulator valve 20. For example, the poppet 88 and the throat 92 may be made of rhenium molybdenum and the valve shaft 90 may be made of Inconel 718 or a ceramic matrix composite.

The vent valve 22 may be an off-the-shelf component that is used as is or adapted for use with the attitude control system 12, or the vent valve may be a custom designed component. In one embodiment, the vent valve 22 satisfies one or more of the specifications set forth below in Table 6. This design of the vent valve 22 may be especially suitable for use with a low level attitude control system.

TABLE 6

Vent Valve Specifications

| Parameter | Value |
|---|---|
| Contraction Ratio | Min. 3:1 relative to propellant grain |
| Natural throat area | Scaled to ≥1.1× operational throat |
| Permissible leak rate | TBD |
| Response time | ≥2 inches/sec to 90% full stroke |
| Max. total stroke | ≤0.300 inches |
| L* (at max free volume) | ≥200:1 |
| Pdot rate (at max free volume) | ≥10,000 psia/sec |
| Duty cycle | ≥28 close/open/close cycles; random operation over 300 seconds. |

Figure 16:
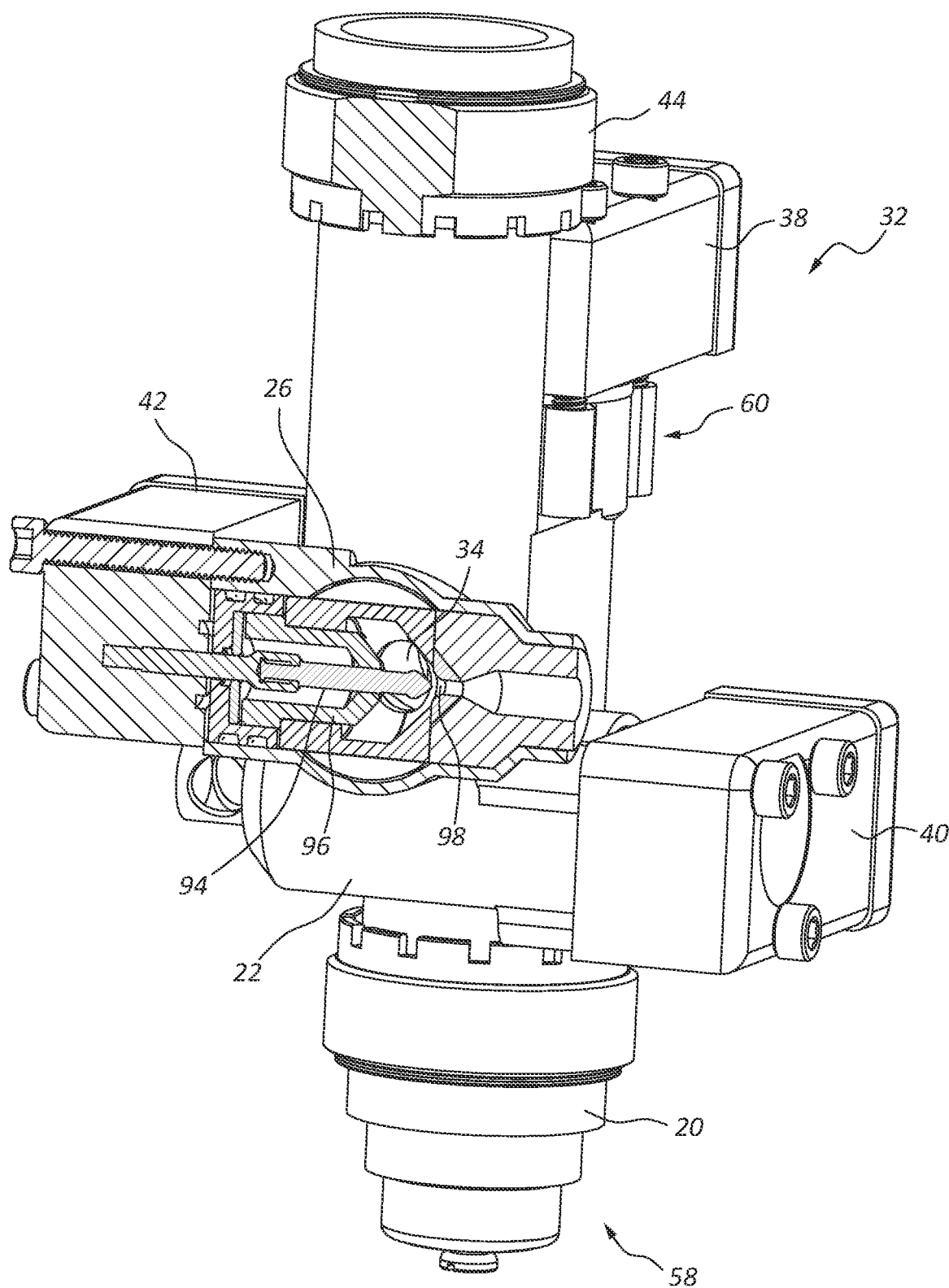
FIG. 16 is a cross sectional perspective view of the divert valve in accordance with at least some embodiments.

Referring to FIG. 16, one embodiment of the divert valve 26 is shown. The divert valve 26 includes many of the same components as the actuator valve 20. For example, the divert valve 26 includes a pintle 94, pintle guide 96, and throat 98. The divert valve 26 moves between an open position where the pintle 94 is spaced apart from throat 98 and a closed position where the pintle 94 is in contact with the throat 98. In one embodiment, the actuator 42 moves the pintle 94 lengthwise into and out of contact with the throat 98 to close and open the divert valve 26.

It should be appreciated that the components in the divert valve 26 may be made of any suitable material including those already mentioned above in connection with the accumulator valve 20. For example, the pintle 94 and the throat 98 may be made of rhenium molybdenum and the pintle guide 96 can be made of Inconel 718 or a ceramic matrix composite.

The divert valve 26 may be an off-the-shelf component that is used as is or adapted for use with the attitude control system 12, or it can be a custom designed component. In one embodiment, the divert valve 26 satisfies one or more of the specifications set forth below in Table 7. This design of the divert valve 26 may be especially suitable for use with a low level attitude control system.

TABLE 7

Divert Ignition Valve Specifications

| Parameter | Value |
|---|---|
| Contraction Ratio | Min. 3:1 relative to propellant grain |
| Operating throat area | 0.00399 in$^2$ |
| Natural throat area | 0.00439 in$^2$ (ø0.075 inches) |
| Pintle slope | 0.05 in$^2$/in |
| Expansion ratio | Max 2:1 relative to operating throat area |
| Permissible leak rate | TBD |
| Response time | ≥2 inches/sec to 90% full stroke |
| Max. total stroke | ≤0.300 inches |

It should be appreciated that any suitable thrusters 24 may be used with the attitude control system 12. In general, it is desirable to use thrusters 24 that seal tightly when closed and offer proportional control (versus on/off control). The thrusters 24 may provide accurate thruster delivery and minimum impulse bit (MIB) throughout de-pressurization of the accumulator 16.

Operation of the thrusters 24 when the accumulator 16 is not being recharged provides the flight vehicle with inherent quiescent thruster delivery that enhances target acquisition capability for flight vehicles such as the kinetic warhead. The thrusters 24 are preferably lightweight and low cost due to maintaining the gas temperature in the accumulator <2000° F. enabling uninsulated metallic manifolds and thruster designs. The thrusters 24 are placed as far aft as practical to increase pitch/yaw moment capability, which minimizes the attitude control system impulse and thruster levels.

In one embodiment, the thrusters 24 satisfy one or more of the specifications set forth below in Table 8. This design of the thrusters 24 may be especially suitable for use with a low level attitude control system.

TABLE 8

Thruster Specifications

| Parameter | Value |
| --- | --- |
| Peak thrust | 2.5 lbf |
| Thrust rate | 125 lbf/sec |
| Frequency response | 25 Hz operation at ±1% amplitude and 90° phase |
| Thrust resolution | 0.3 lbf |
| Max. impulse (per thruster) | 50 lbf-sec |

Actuators

The actuators 38, 40, 42 may be any suitable actuators. In one embodiment, one or more of the actuators 38, 40, 42 are off-the-shelf actuators that are used as it or adapted for use with the valves 20, 22, 26. In another embodiment, the actuators 38, 40, 42 are custom designed.

In one embodiment, the actuators 38, 40, 42 satisfy one or more of the specifications set forth below in Table 9. This design of the actuators 38, 40, 42 may be especially suitable for use with a low level attitude control system.

TABLE 9

Common Actuator Specifications

| Parameter | Value |
| --- | --- |
| Operation type | Proportionally commanded |
| Stroke length | 0.350 inches (±0.025/−0.000) |
| Operating load | 300 lbf, tension and compression (t&c) |
| Min. load vs. position profile | 300 lbf over entire stroke (t&c) |
| Inertial load | 0.05 lbm |
| Min. slew rate | ≥4 inches/sec over entire stroke and at 300 lbf (t&c) loading |
| Min. frequency response | 25 Hz at ±1% amplitude at −3 dB or 90° phase lag at 300 lbf loading |
| Position accuracy | ≤0.002 inches over entire stroke and at 300 lbf (t&c) loading |
| Position command threshold | ≤0.002 inches over entire stroke and at 0 and 300 lbf (t&c) loading |
| Duty cycle | Continuous operation for 300+ seconds at 1 Hz cycling, 100% amplitude, and 100 lbf loading |
| Ambient altitude/pressure | Sea-level to high altitude |
| Ambient operation temp | 40° F. to 120° F. |
| Temperature at interface | Linear temperature increase from 75° F. to 300° F. over 300 seconds |

It should be noted that for purposes of this disclosure, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

The term "coupled" also refers to joining that is permanent in nature or releasable and/or removable in nature. Permanent joining refers to joining the components together in a manner that is not capable of being reversed or returned to the original condition. Releasable joining refers to joining the components together in a manner that is capable of being reversed or returned to the original condition.

EXAMPLES

The following examples are provided to further illustrate the disclosed subject matter. They should not be used to constrict or limit the scope of the claims in any way.

Example 1

Figure 17:
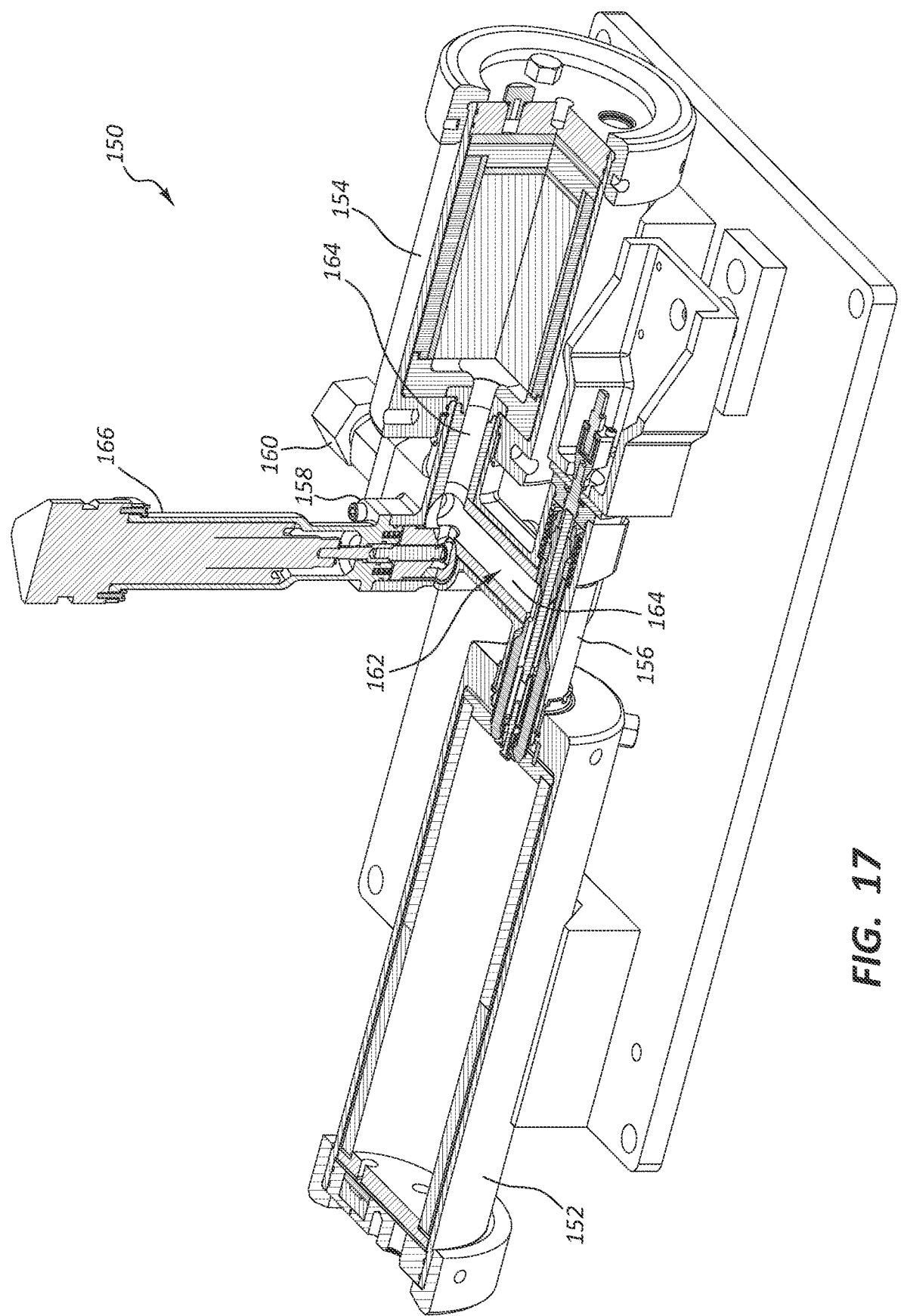
FIG. 17 is a partial cross-sectional perspective view of an attitude control system in accordance with at least some embodiments.
Figure 18:
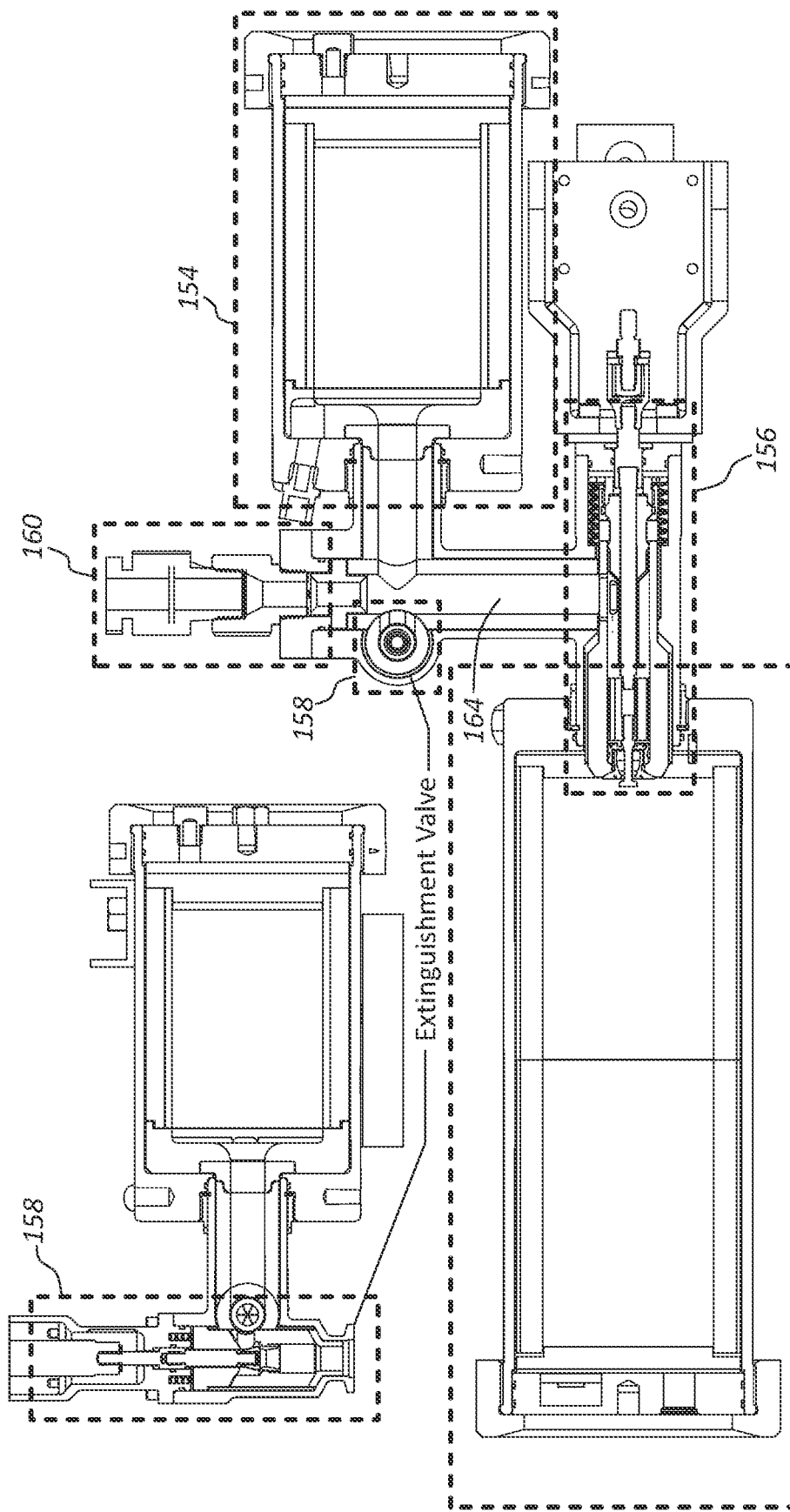
FIG. 18 is a cross-sectional top view of the attitude control system with the major components delineated by dashed rectangles in accordance with at least some embodiments.

A hot fire test of a hot gas attitude control system 150 was performed using the prototype system shown in FIGS. 17-18. The prototype system 150 was used to demonstrate the feasibility of such a system when used as part of a solid propellant divert and attitude control system (SDACS) for a guided missile. The hot gas attitude control system would provide hot gas to: (1) the thrusters that control the attitude of the guided missile and (2) the propellant in the divert system to ignite one or more times as part of a divert operation.

It should be noted that the prototype system 150 is not identical to a system that would be used on a guided missile. However, the components, internal materials, ballistic configuration and envelope of the prototype system 150 are representative of a flight design. Thus, the prototype hardware and associated hot fire test results can be used to assess the feasibility of flight ready low level attitude control system design such as the one shown above.

The prototype system 150 included an accumulator 152, a gas generator (GG) 154, an accumulator valve 156, a vent valve or extinguishment valve 158, an expansion port 160, and an accumulator valve housing assembly 162. The prototype system 150 also included an accumulator valve actuator (not shown) and a vent valve actuator 166. The actuators are conventional actuators used in these types of applications. The prototype system 150 included various sensors (not shown) to collect important operational characteristics such as pressure and temperature.

As shown in FIGS. 17-18, the gas generator 154, the accumulator valve 156, the vent valve 158, and the expansion port 160 were all operatively coupled to the accumulator valve housing assembly 162. The accumulator valve housing assembly 162 included a central passage 164 through which hot gas can flow between each of the attached components. The accumulator valve 156 was positioned between the accumulator 152 and the passage 164 to control the flow of hot gas to and/or from the accumulator 152.

The prototype system 150 was set up as follows. A start propellant grain was positioned in the accumulator 152 with the rest of the propellant being in the gas generator 154. The expansion port 160 was capped with a burst disk. The expansion port 160 was included so that a divert system can be coupled to the system 150 in future tests. In such a configuration, a divert system ignition valve would be coupled to the expansion port 160 to selectively and repeatedly allow hot gas into the divert system to ignite the propellant for divert operations.

Figure 21:
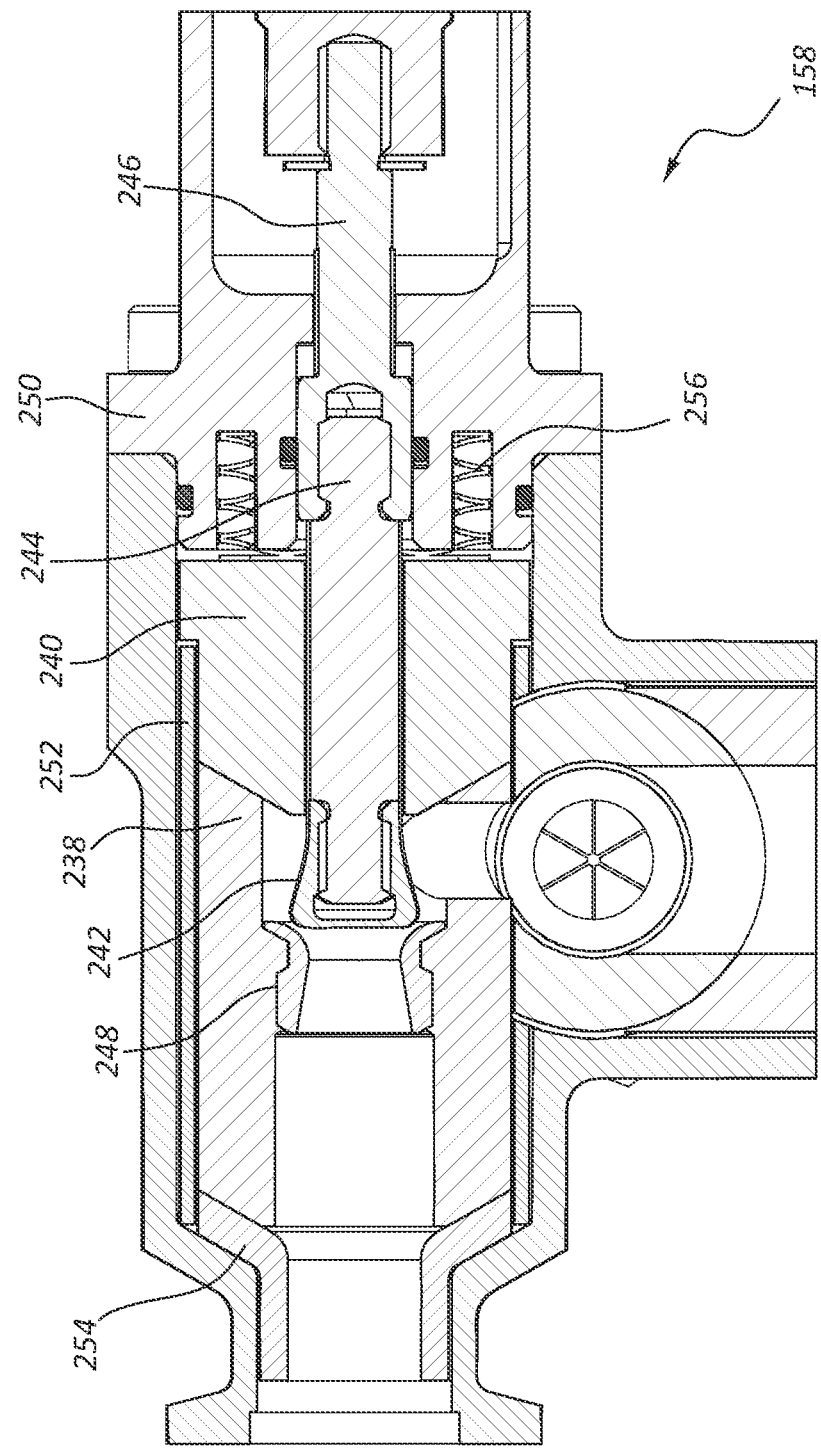
FIG. 21 is a cross-sectional view of the vent valve in the attitude control system in accordance with at least some embodiments.
Figure 22:
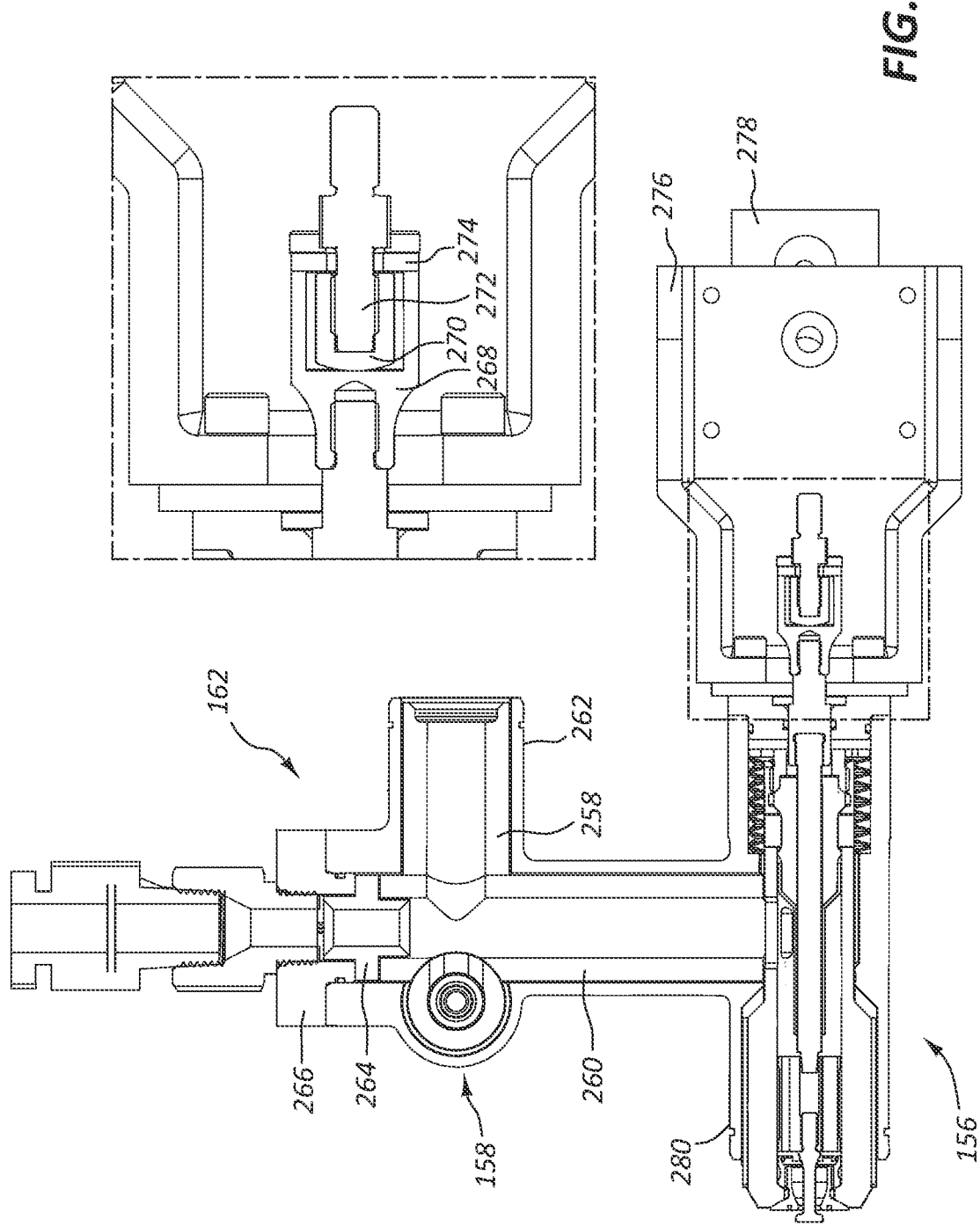
FIG. 22 is a cross-sectional view of the accumulator valve housing assembly in the attitude control system in accordance with at least some embodiments.
Figure 23:
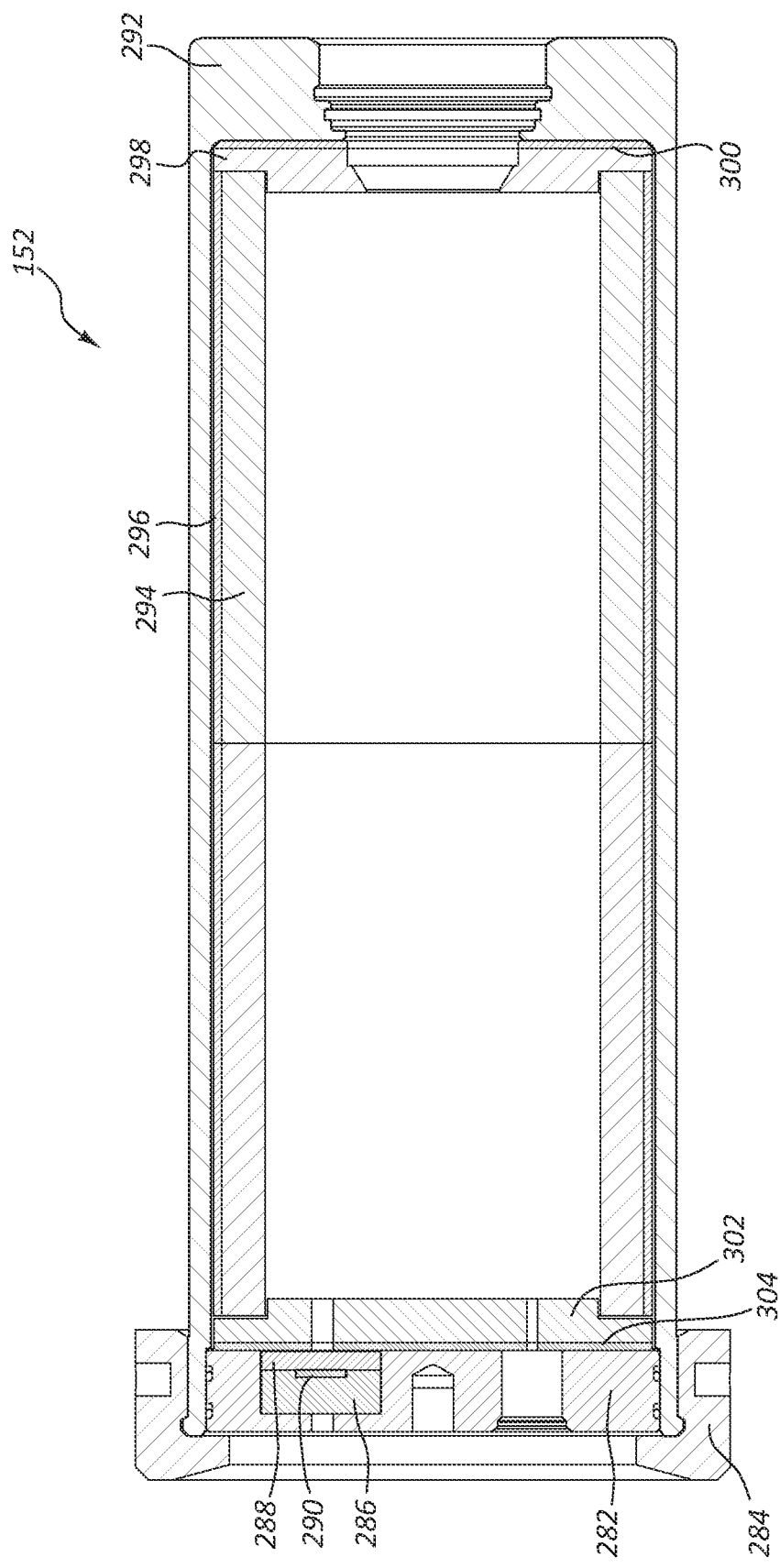
FIG. 23 is a cross-sectional view of the accumulator housing in the attitude control system in accordance with at least some embodiments.

FIGS. 19-24 and Table 10 to Table 15 show the structure and materials for the accumulator 152 (FIG. 23; Table 14), gas generator 154 (FIG. 24; Table 15), accumulator valve 156 (FIGS. 19-20; Table 11), vent valve (FIG. 21; Table 12), and the accumulator valve housing assembly 162 (FIG. 22; Table 13).

TABLE 10

Description of Materials

| Material | Description |
| --- | --- |
| Moly | Molybdenum |
| ReMo | Rhenium molybdenum |
| 17-4 H1150 | 17-4 H1150 stainless steel alloy |
| C-ZrOC | Carbon zirconium oxide carbide ceramic matric composite |
| S-phenolic | Silica phenolic |
| C-phenolic | Carbon phenolic |
| EPDM | Ethylene propylene diene monomer (M-class) rubber |
| Inconel 718 | Nickel chromium alloy |
| 300 Series | 300 series austenitic stainless steel |
| Garolite | Reinforced phenolic material |
| Garolite CE | Medium weave cotton cloth phenolic |

TABLE 11

Figure 19:
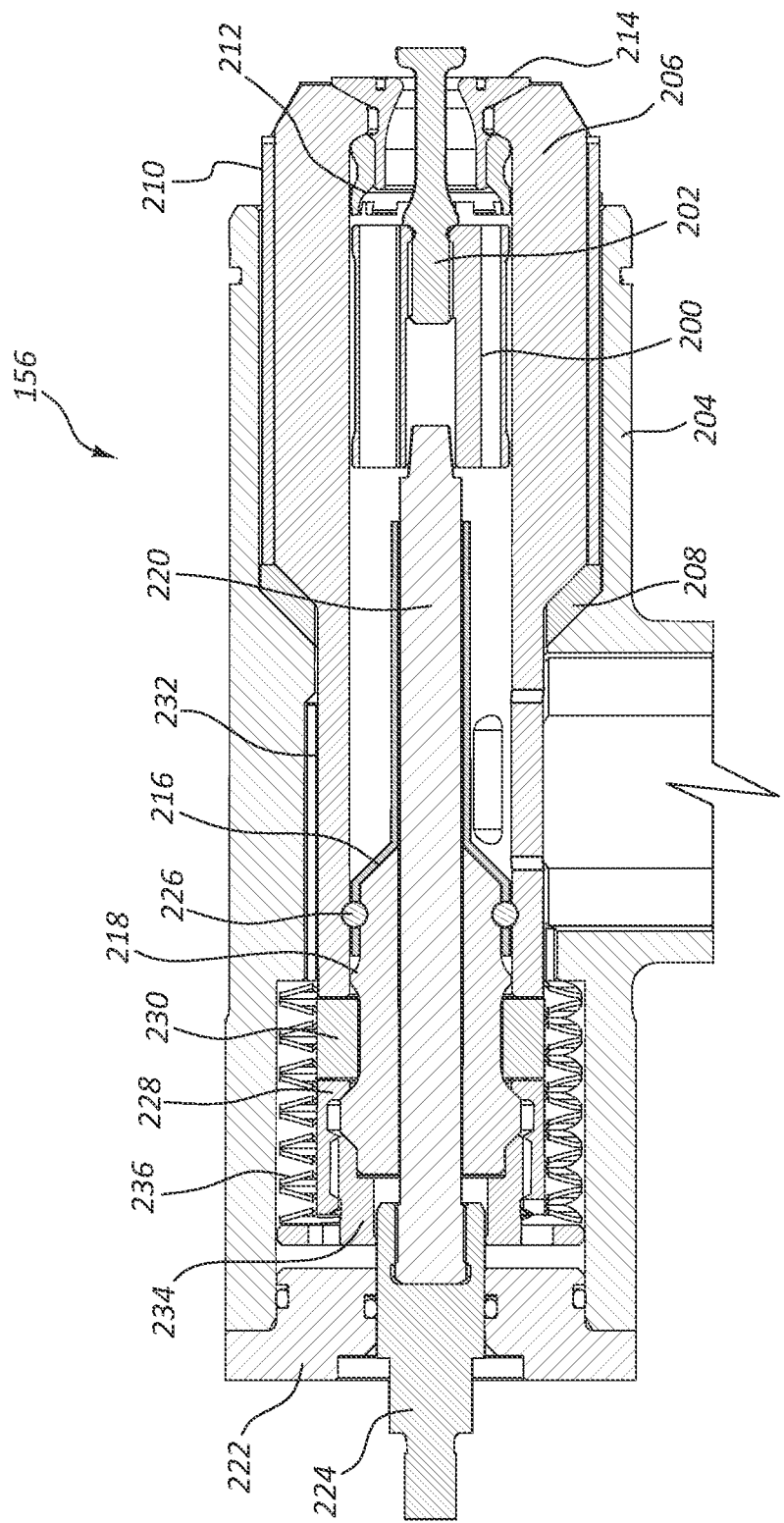
FIG. 19 is a cross-sectional view of the accumulator valve in the attitude control system in accordance with at least some embodiments.
Figure 20:
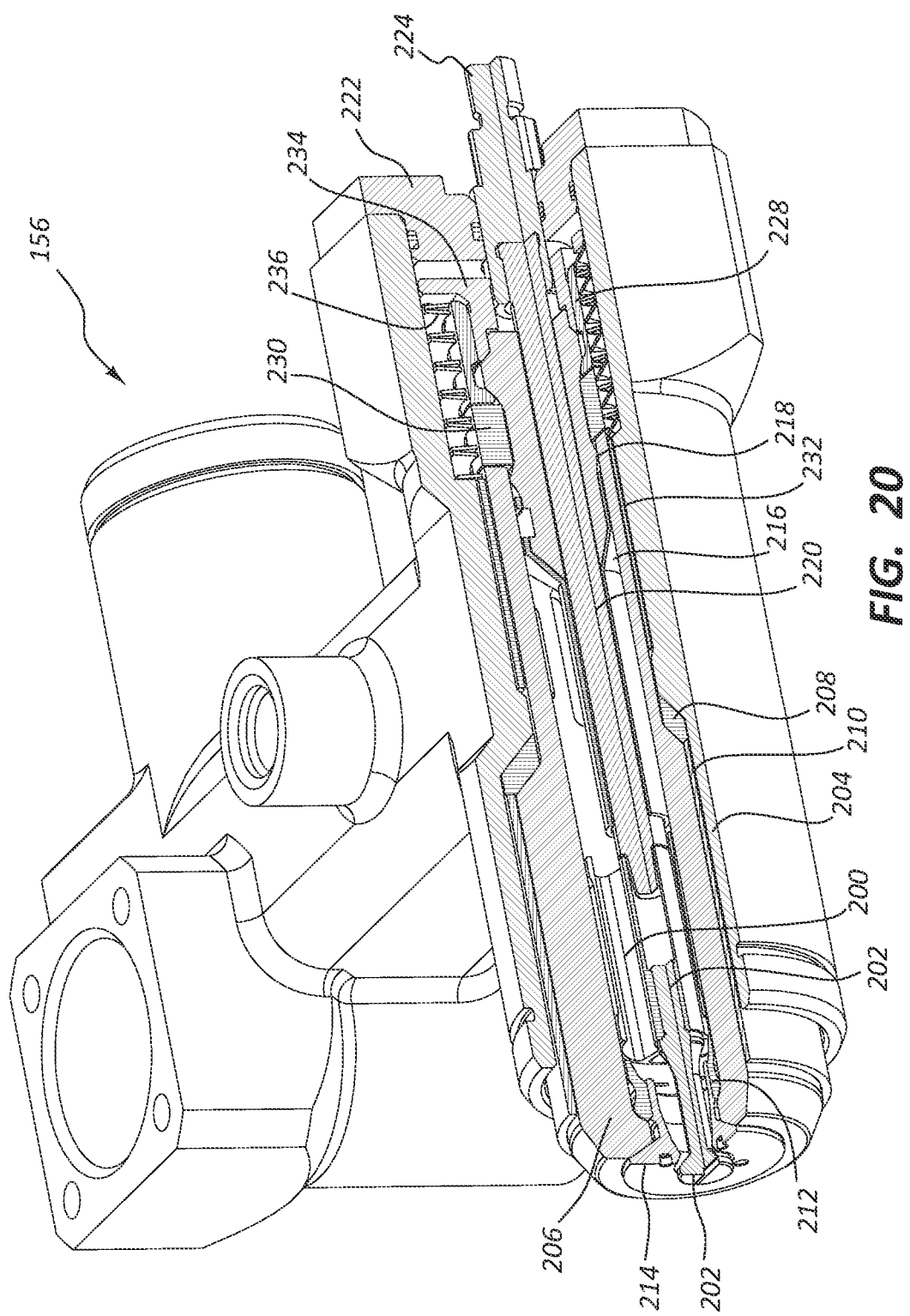
FIG. 20 is a partial cross-sectional perspective view of the accumulator valve in the attitude control system in accordance with at least some embodiments.

Accumulator Valve Materials (FIGS. 19-20)

| Ref. Num. | Name | Material |
| --- | --- | --- |
| 200 | Poppet guide | Moly |
| 202 | Poppet | ReMo |
| 204 | Housing | 17-4 H1150 |
| 206 | Valve body | C-ZrOC |
| 208 | Conic seal | S-phenolic |
| 210 | Valve body insulator | EPDM |
| 212 | Throat retainer | Moly |
| 214 | Throat | ReMo |
| 216 | Shaft shield | Moly |
| 218 | Standoff insulator | C-ZrOC |
| 220 | Accumulator shaft | C-ZrOC |
| 222 | Actuator closure | 17-4 H1150 |
| 224 | Actuator adapter | Inconel 718 |
| 226 | Retaining pin | Tungsten |
| 228 | Retainer nut | Inconel 718 |
| 230 | Retainer insulator | S-phenolic |
| 232 | Collar insulator | S-phenolic |
| 234 | Collar retainer | Inconel 718 |
| 236 | Wavespring | |

TABLE 12

Vent Valve Materials (FIG. 21)

| Ref. Num. | Name | Material |
| --- | --- | --- |
| 238 | Vent valve body | C-ZrOC |
| 240 | Vent plenum insulator | S-phenolic |
| 242 | Vent poppet | ReMo |
| 244 | Vent shaft | C-ZrOC |
| 246 | Vent actuator adapter | Inconel 718 |
| 248 | Vent throat | ReMo |
| 250 | Vent seal closure | 17-4 H1150 |
| 252 | Vent valve body insulator | EPDM |
| 254 | Vacuum tube insulator | S-phenolic |
| 256 | Wavespring | |

TABLE 13

Accumulator Valve Housing Assembly Materials (FIG. 22)

| Ref. Num. | Name | Material |
| --- | --- | --- |
| 258 | GG inlet insulator | S-phenolic |
| 260 | Gas tube insulator | S-phenolic |
| 262 | GG castle nut | 300 series |
| 264 | Burst disk insulator | S-phenolic |
| 266 | Burst disk closure | 17-4 H1150 |
| 268 | Centering housing | 300 series |
| 270 | Centering bullet | 300 series |
| 272 | Centering shaft | 300 series |
| 274 | Centering bracket | 300 series |
| 276 | Actuator bracket | Aluminum |
| 278 | Actuator base | Aluminum |
| 280 | Accumulator castle nut | 300 series |

TABLE 14

Accumulator Materials (FIG. 23)

| Ref. Num. | Name | Material |
| --- | --- | --- |
| 282 | Accumulator closure | 17-4 H1150 |
| 284 | End cap | 17-4 H1150 |
| 286 | Bleed orifice insulator | C-phenolic |
| 288 | Orifice entrance insulator | C-phenolic |
| 290 | Bleed orifice | Moly |
| 292 | Accumulator chamber | 17-4 H1150 |
| 294 | Case sleeve insulator assembly | EPDM |
| 296 | Case sleeve | Garolite |
| 298 | Front plate insulator assembly | EPDM |
| 300 | Front plate | Garolite CE |
| 302 | Rear plate insulator assembly | EPDM |
| 304 | Rear plate | Garolite |

TABLE 15

Figure 24:
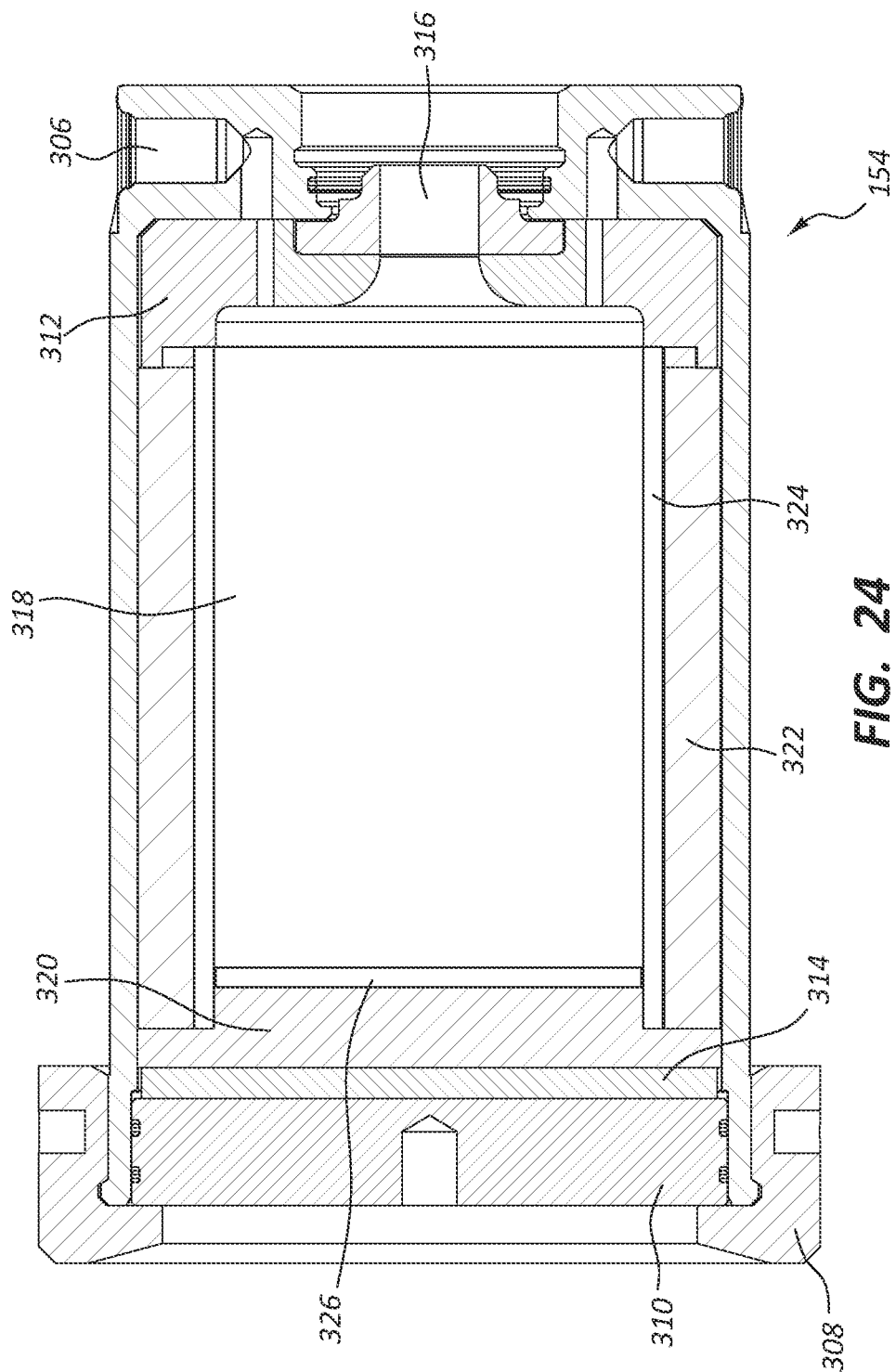
FIG. 24 is a cross-sectional view of the gas generator in the attitude control system in accordance with at least some embodiments.

Generator Materials (FIG. 24)

| Ref. Num. | Name | Material |
| --- | --- | --- |
| 306 | GG chamber | 17-4H1150 |
| 308 | End cap | 17-4H1150 |
| 310 | GG closure | 17-4H1150 |
| 312 | GG forward insulator | C-phenolic |
| 314 | GG rear shim insulator | Garolite CE |
| 316 | GG tuber spacer insulator | S-phenolic |
| 318 | Propellant cup | AAP-3797 |
| 320 | GG propellant base | Garolite CE |
| 322 | GG propellant sleeve | Garolite CE |
| 324 | Propellant cup insulator sleeve | EPDM |
| 326 | Propellant cup insulator base | EPDM |

The accumulator valve body 206 had a 0.300 inch wall thickness and was designed to withstand a maximum expected operating pressure of 2,250 psia and a maximum operating temperature of 2,000° F. The other components in the prototype system 150 were designed to withstand a maximum expected operating pressure of 3,500 psia. This meant that the C—ZrOC components drove the design of the other structures.

The accumulator valve body 206 and the vent valve body 238 were coated with 0.0010±0.0005 inch of silicon carbide (SiC) to prevent hot gas from flowing through these components. The valve bodies 206, 238 are made of C—ZrOC, which is inherently porous. Hot gas can leak through these parts when they are pressurized. The SiC coating helps prevent hot gas from leaking. Also, the hot fire tests revealed that the particles in the hot gas also help to plug and seal the pores in the C—ZrOC components.

The hot fire test had the following primary objectives: (1) demonstrate operation of the accumulator valve 156 for 200 seconds, (2) demonstrate operation of the accumulator valve poppet 202, control system, and gas flow operations, and (3) demonstrate basic propellant operations including ignition, extinguishment, and re-ignition. The hot fire test had the following secondary objectives: (1) demonstrate basic ballistics, (2) measure burnback of the propellant, pressure drops, and performance of the accumulator 152, (3) demonstrate control logic, and (4) demonstrate rack operation, vacuum, and ignition system.

The prototype system 150 was configured to operate in the following manner. An initial start propellant grain is ignited in the accumulator 152 with the accumulator valve 156 closed. The pressure rises in the accumulator until it exceeds 1,260 psia. At this point, the controller initiates a recharge event by opening the accumulator valve 156 and allowing hot gas to enter the gas generator 154 and ignite the propellant 318.

The hot gas flows from the gas generator 154 to the accumulator 152 until it reaches a pressure of 1900 psia. The gas generator 154 is extinguished by closing the accumulator valve 156 and opening the vent valve 158. The pressure drops in the accumulator 152 as hot gas exits through the bleed orifice 290. Another recharge event is initiated when one of the following events occurs: (1) the pressure reaches a minimum level in the accumulator 152 or (2) ten seconds have elapsed. The minimum pressure level in the accumulator 152 was set at 1,000 psia for the first three recharges and 500 psia thereafter. The hot fire test is conducted under conditions that simulate high altitude >50,000 ft and temperatures of 40° F.-90° F.

Before the hot fire test, the prototype system 150 was pressure and leak tested using inert gas. The accumulator valve 156 was tested to verify that it moved accurately and without issues. The other hardware in the prototype system 150 was tested to verify that its performance was acceptable for the purposes of the test. The propellant 318 was X-rayed to ensure no cracks or voids existed in the grains which could cause unintended consequences during a test. The prototype system 150 was secured inside a modified magazine.

Figure 25:
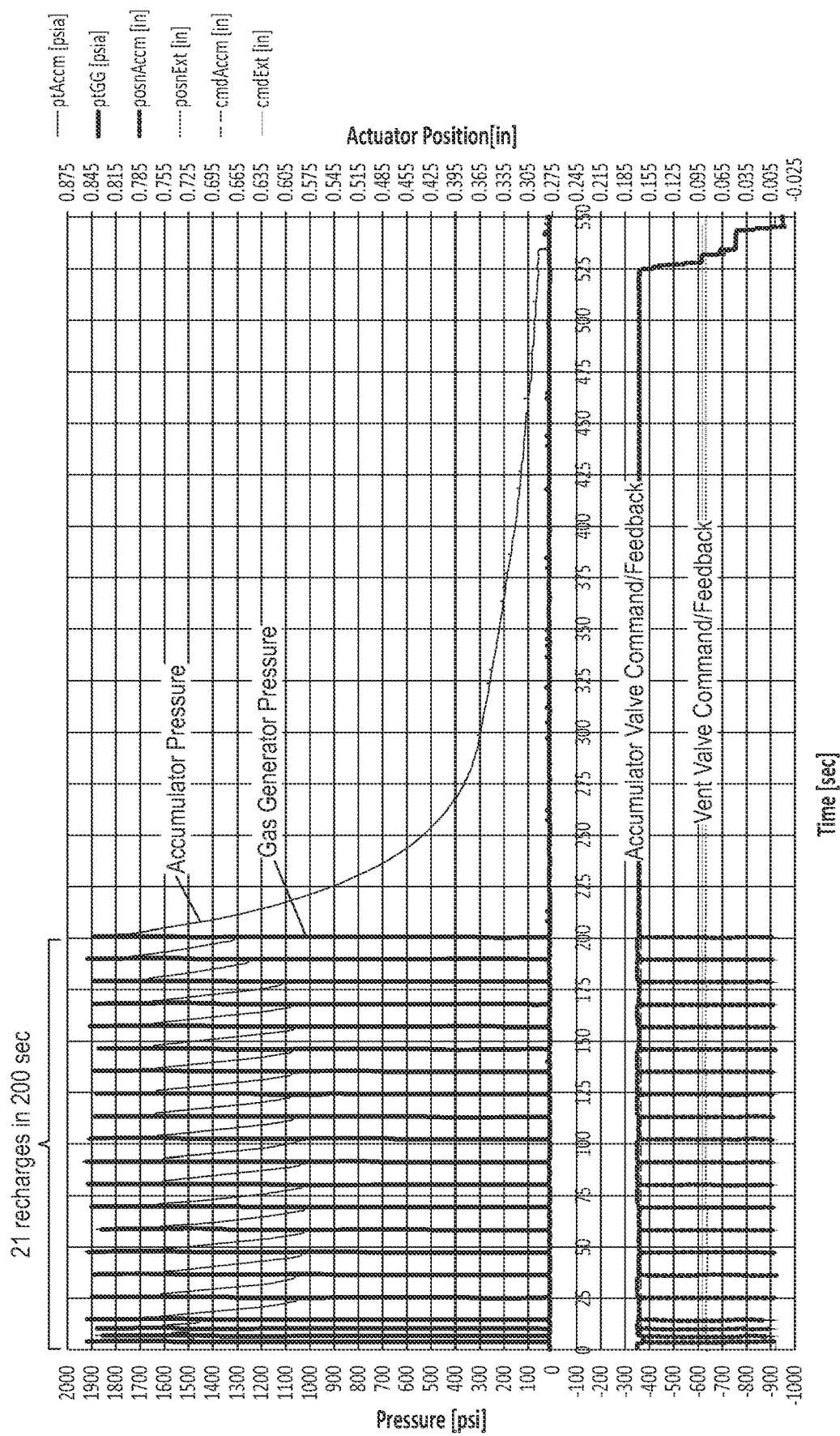
FIG. 25 is a graph of the test data produced by a first hot fire of the attitude control system in accordance with at least some embodiments.

FIG. 25 shows the test data in its completeness and, for all intent and purposes, indicates no major anomalies. The initial pressurization charge in the accumulator 152 successfully triggered the software controller and started a series of recharges. The first three recharges are pressure-triggered when the accumulator reaches approximately 1,400 psia. The remaining recharges occurred after the ten second timeout period elapsed. In total, twenty one recharges occurred in the specified 200 second mission time, and afterward pressure in the accumulator was held for an addition 300 seconds.

Figure 26:
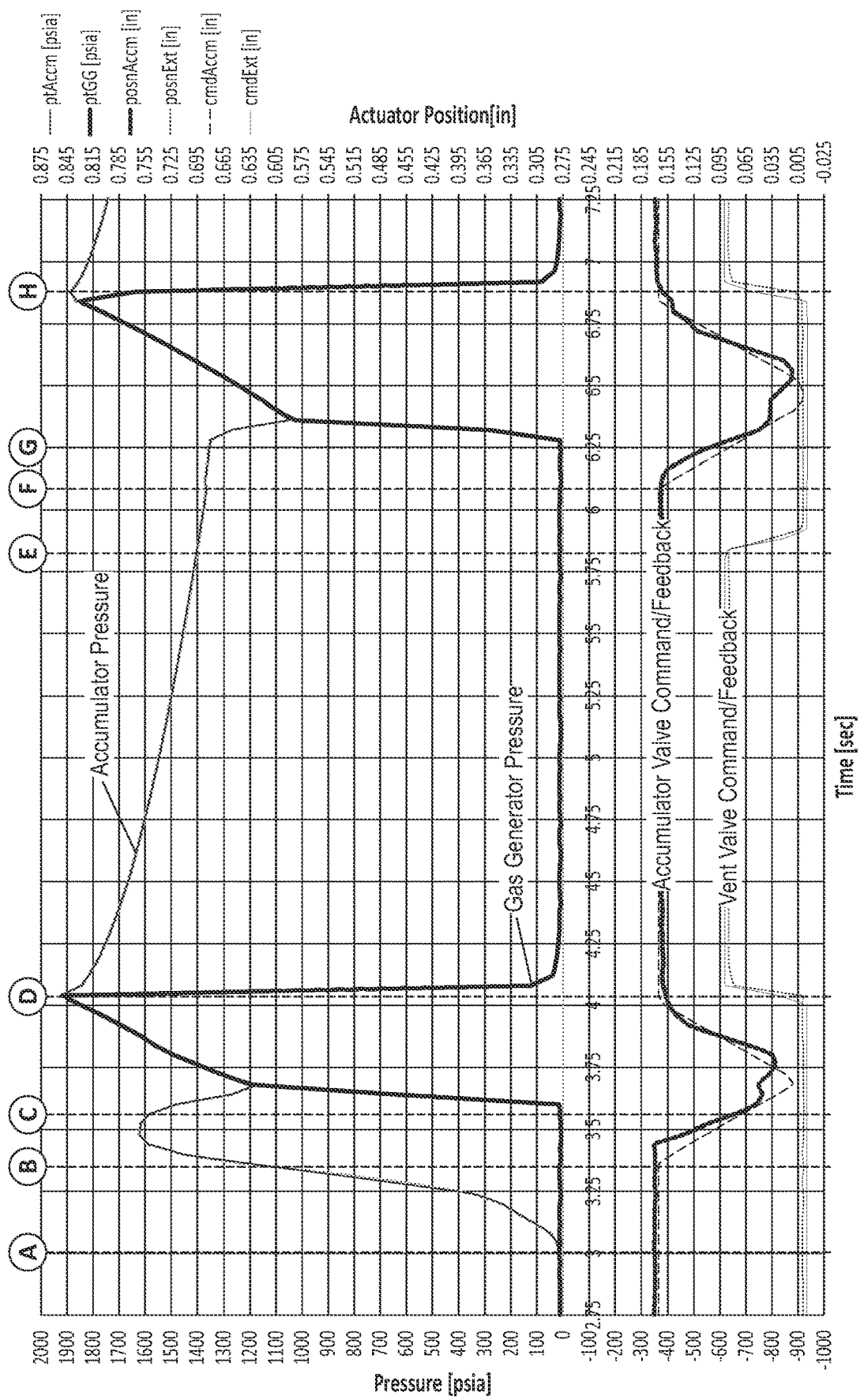
FIG. 26 is a detailed graph of the data in FIG. 25 for the first 7.25 seconds of the hot fire test, which includes the initial pressurization and first recharge of the accumulator in accordance with at least some embodiments.

The pressure in the prototype system 150 stayed well below the maximum expected operating pressure and peaked at 1,941 psia. FIG. 26 shows a detailed record of the initial pressurization and first recharge. The major events are denoted by vertical lines A though H and described as follows.

Event A in FIG. 26 denotes the ignition of the accumulator charge and initial pressurization of the accumulator. At T-0 seconds, power was applied to the nichrome wire to initiate heating of the accumulator pressurization propellant. It took approximately 3.0 seconds for the wire to reach a critical temperature and ignite the initial propellant charge. Within 0.25 seconds, the pressure in the accumulator 152 rapidly increased thereby indicating that the propellant charge was fully ignited.

Event B occurred at T+3.40 seconds. At this point, the pressure in the accumulator 152 exceeded the 1,260 psia threshold and activated the test controller. The test was now running in closed-loop operation. Simultaneously, the controller initiated a recharge event and commanded the accumulator valve 156 to open at the specified 0.5 in/sec slew rate.

Event C occurred at T+3.64 seconds. At this point, the accumulator valve 156 reached a critical position, approximately 0.055 inches, and hot gas backflowed from the accumulator 152 to the gas generator 154. The accumulator shaft 220 deflected a small amount due to the increased pressure load. Within 0.060 seconds, the pressure in the accumulator 152 and the gas generator 154 equalized and the burning propellant 318 began to increase the pressure in the accumulator 152.

Event D occurred at T+4.04 seconds. At this point, the pressure in the accumulator 152 reaches the 1,900 psia trigger. The controller commanded the vent valve 158 to begin opening. By T+4.24 the pressure in the gas generator 154 dropped back to ambient and the pressure in the accumulator 152 sealed the poppet 202 closed. For the next several seconds the pressure in the accumulator 152 was steadily exhausted through the bleed orifice 290.

Event E occurred at T+5.84 seconds. At this point, the pressure in the accumulator 152 reached 1,400 psia and the vent valve 158 started to close to initiate a recharge event. It should be noted that the 1,400 psia limit was intentionally set higher than the 1,000 psia desired recharge pressure so that the vent valve 158 was closed for a short amount of time to determine if the propellant 318 was smoldering. The pressure in the gas generator 154 between event E and F remained steady at approximately 0 psia, meaning the grain was fully extinguished.

Event F occurred at T+6.08 seconds. At this point, a 0.25 second timeout occurs and the accumulator valve 156 was forced to start opening even though the pressure in the accumulator 152 is well above 1,000 psia at 1,380 psia. This was partially due to an inaccurate bleed-down rate—the pressure was expected to have dropped significantly more due to heat transfer to the walls and mass loss through the bleed orifice 290. Audio recording obtained as part of the test data revealed a periodic "whistling" from the bleed orifice 290 that fluctuated in intensity and indicated a partial clog. This partially explained why the pressure did not drop as fast as predicted.

Event G occurred at T+6.32 seconds. At this point, the accumulator poppet 202 opened to the critical position and allowed hot gas from the accumulator 152 to backflow into the gas generator 154 to initiate a recharge.

Event H occurred at T+6.88 seconds. At this point, the accumulator reached the 1,900 psia trigger and the process of extinguishing the gas generator 154 began. From here, the general pattern repeated itself successively. It should be noted that clogging of the bleed orifice 290 became more evident as the test continued. FIG. 26 shows that the pressure in the accumulator 152 at recharge slowly increased from approximately 1,000 psia up to 1,300 psia by the end of the test. The audio recording also confirmed that the "whistling" from the bleed orifice 290 was not as audible.

The hot fire test completely fulfilled all of the primary and secondary test objectives. The performance of the actuator for the accumulator valve 156 was in line with expectations and the control algorithm kept the pressure in the accumulator 152 below the maximum expected operating pressure. The clog in the bleed orifice 290 caused ten second timeouts and recharges for the majority of the test. Because of this, the pressure in the accumulator 152 never dropped below the 500 psia threshold.

Example 2

A hot fire test of the hot gas attitude control system 150 was performed using the prototype system shown in FIGS. 17-18 with a modified duty cycle. The goal of this test was to extend the duty cycle to 300+ seconds by increasing the time between recharges. The prototype system 150 was largely the same as in Example 1 except that some of the sensors and instrumentation were upgraded. Prior to running the test, the hardware was tested using the same procedures described above in Example 1.

Figure 27:
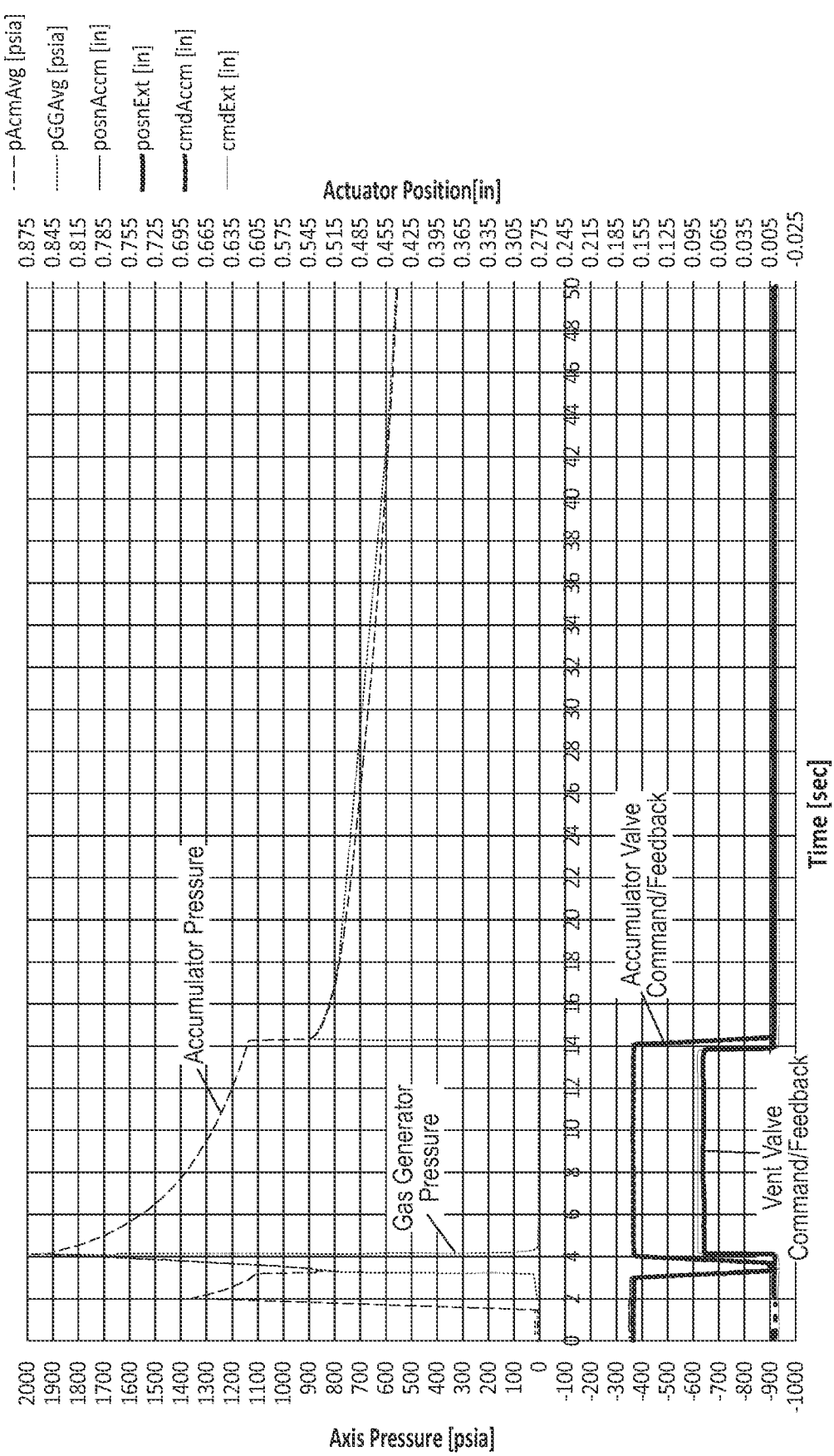
FIG. 27 is a graph of the test data produced by a second hot fire of the attitude control system in accordance with at least some embodiments.

FIG. 27 shows the results of hot fire test. This test did not meet its primary objective of demonstrating multiple recharges in a 300 second duty cycle. As shown in FIG. 27, the initial propellant charge pressurized the accumulator 152 to approximately 1,350 psia and activated the controller at approximately T+2 seconds. The pressure in the accumulator 152 dropped to 1,125 psia at approximately T+3 seconds and initiated a recharge sequence (i.e., accumulator valve 156 was opened) that ignited the propellant 318 in the gas generator 154. The propellant 318 in the gas generator burned until the pressure in the accumulator 152 reached 1,975 psia at approximately T+4 seconds. The pressure in the accumulator 152 was allowed to bleed down for approximately 10 seconds to 1,125 psia when another recharge sequence started.

FIG. 27 shows that the pressure in the gas generator 154 rapidly reached equilibrium with the pressure in the accumulator 152 but there is no indication that the propellant 318 reignited. The accumulator valve 156 remained open and the test continued for approximately 380 seconds without the propellant 318 reigniting.

After evaluating the thermal test date, the cause of the re-ignition failure is believed to be the ten second dwell time between the last ignition and the subsequent ignition attempt. The prototype system 150 has a large thermal mass that absorbed too much of the heat between the first ignition event and the subsequent failed re-ignition attempt. The temperature of the hot gas was too low at the time of the failed re-ignition event to ignite the propellant 318.

Despite the failed re-ignition, the control logic continued to operate nominally. The controller recognized that it failed to ignite and continued to command a recharge until the test was manually stopped.

Example 3

A hot fire test of the hot gas attitude control system 150 was performed using the prototype system shown in FIGS. 17-18 to correct the problems identified in Example 2 and extend the duty cycle to 500+ seconds. The prototype system 150 was largely the same as in Example 2. Prior to running the test, the hardware was tested using the same procedures described above in Example 1.

The duty cycle was modified in the following ways based on the test in Example 2. The pressure level at which the accumulator 152 would trigger a recharge was changed from 1,125 psia back to 1,400 psia (what it was in Example 1). The duty cycle was modified to include a warm-up period where the first three recharges are subject to a 2.5, 3.0, and 3.5 second timeout. What this means is that the first recharge would be initiated after 2.5 seconds, the second after 3.0 seconds, and the third after 3.5 seconds regardless whether the pressure in the accumulator 152 had dropped below the low pressure level.

After the warm-up period the duty cycle was set to revert to a ten second timeout for the first minute of the test. After the first minute, the recharge timeouts were gradually increased from 10 seconds to 25 seconds. After 325 seconds, the control logic transitioned into an extended mission mode where the recharge timeout and minimum pressure recharge trigger were set aggressively to 45 seconds and 750 psia, respectively. The test was set to run indefinitely until it was manually stopped.

Figure 28:
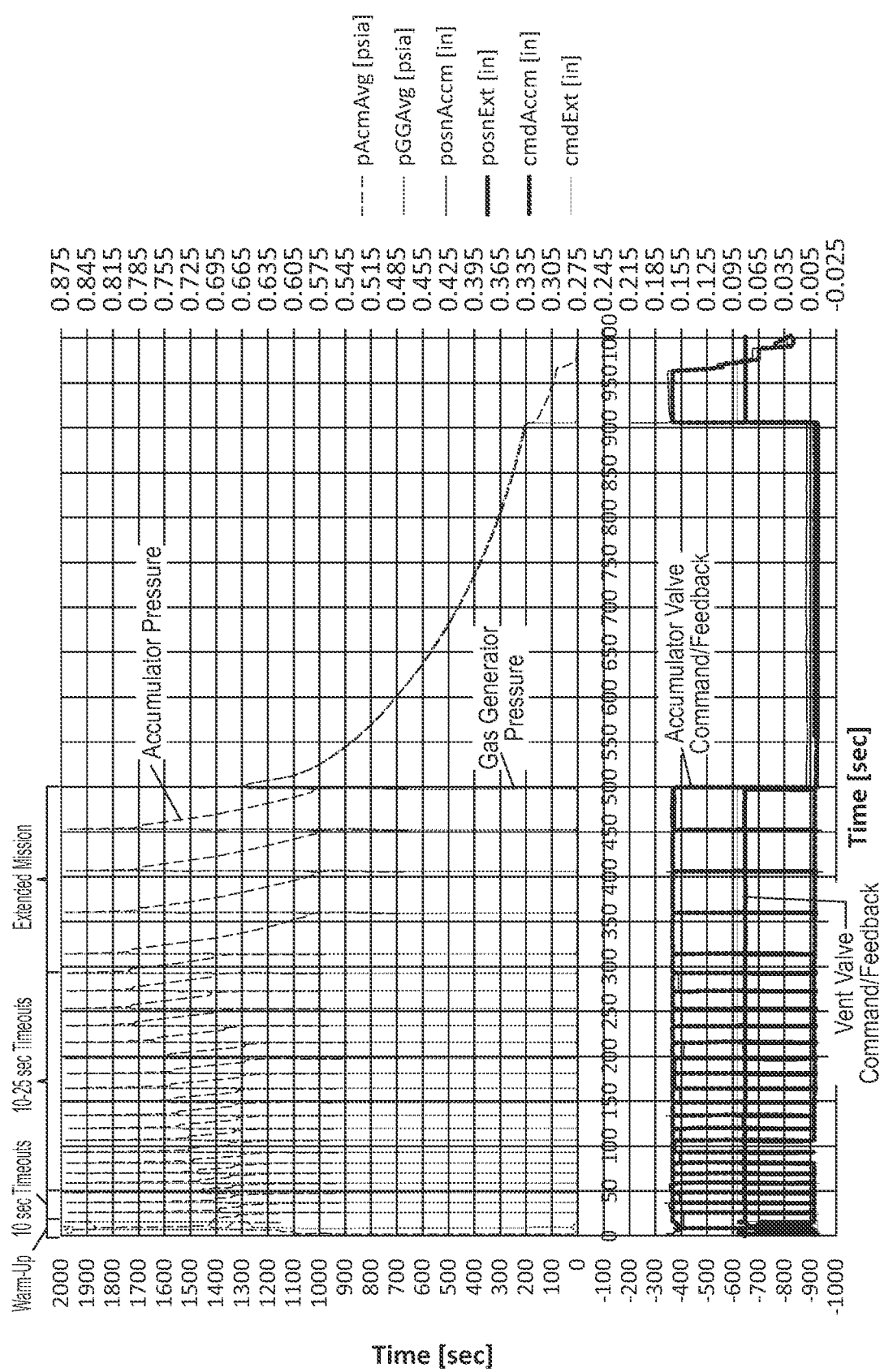
FIG. 28 is a graph of the test data produced by a third hot fire of the attitude control system in accordance with at least some embodiments.

The results of the hot fire test are shown in FIG. 28. The modifications to the duty cycle successfully extended the operational time to 500+ seconds. The first sixty seconds of the duty cycle in this test match closely the same data from the test in Example 1. This duty cycle does a good job of thermally conditioning the system 150 as shown by the fact that all subsequent recharges occurred without incident.

At T+325 seconds the test successfully demonstrated the capability of performing four recharges 45 seconds apart before running out of the propellant 318 midway through a recharge at T+500 seconds. When the propellant rant out, the accumulator valve 156 was retracted and the hot gas inside the accumulator 152 was held for an additional 400 seconds for a total mission time of 900 seconds. During this time, the pressure in the accumulator 152 gradually decayed at an average rate of approximately −3.25 psi/sec due to a partial clog in the bleed orifice 290. At T+905, the test was stopped and the pressure was vented from the system 150. It should be noted that the peak pressure during all the recharges stayed below 1,986 psia, which is only slightly above the target pressure of 1,975 psia and well below the 2,500 psia maximum expected operating pressure.

This test consumed the entire propellant grain in an effort to demonstrate the maximum capability of the system 150. Assuming a targeted flight-$I_{sp}$ of 185 sec, the full 1.1 lbm of propellant 318 is equivalent to 204 lb-sec of impulse through one valve. This is a substantial improvement over the target amount of only 100 lb-sec of impulse over 300 seconds of operation.

The hot fire test satisfied all primary and secondary objectives. The system 150 demonstrated 24 recharges spanning a 325 second time frame by revising the initial duty cycle to match the previously successful test in Example 1. Afterward, the system 150 used aggressive recharge timeouts and pressure triggers to demonstrate an additional four recharges with 45 second dwell times. The current system 150 and especially the accumulator valve 156 show that it has a substantial margin for error. This shows that there is an opportunity to significantly reduce the weight of the system 150 and/or implement duty cycles well in excess of 500 seconds and 200 lb-sec of impulse through a single valve.

Illustrative Embodiments

Reference is made in the following sections to a number of illustrative embodiments of the disclosed subject matter. The following example embodiments illustrate only a few selected embodiments that may include one or more of the various features, characteristics, and advantages of the disclosed subject matter. Accordingly, the following embodiments should not be considered as being comprehensive of all of the possible embodiments.

In one embodiment, an attitude control system comprises: a gas generator including a propellant; an accumulator coupled to the gas generator, the accumulator being in fluid communication with the gas generator to allow hot gas produced by burning the propellant to flow between the accumulator and the gas generator; and a valve positioned between the gas generator and the accumulator, the valve including a main body; wherein the main body extends into the accumulator.

The valve may be an accumulator valve and the attitude control system may comprise a vent valve and a passage extending between the gas generator and the accumulator valve, wherein the vent valve moves between an open position where the passage is open to the outside and a closed position where the passage is not open to the outside. The attitude control system may comprise a valve shaft that moves between a first position where the valve is closed and a second position where the valve is open, the valve shaft including a ceramic matrix composite.

Pressure in the accumulator may cause hoop compression of the portion of the main body extending into the accumulator. The main body may include a ceramic matrix composite. The main body may include C—ZrOC or C—SiC. The attitude control system may comprise one or more thrusters coupled to the accumulator. The valve may be an accumulator valve and the attitude control system may comprise a divert valve that moves between an open position where the accumulator and/or the gas generator are in fluid communication with a divert system and a closed position where the accumulator and/or the gas generator are not in fluid communication with the divert system.

In another embodiment, an attitude control system comprises: a gas generator including a propellant; an accumulator coupled to the gas generator, the accumulator being in fluid communication with the gas generator to allow hot gas produced by burning the propellant to flow between the accumulator and the gas generator; and a valve positioned between the gas generator and the accumulator, the valve including a main body made of a ceramic matrix composite.

The valve may be an accumulator valve and the attitude control system may comprise a vent valve and a passage extending between the gas generator and the accumulator valve, wherein the vent valve moves between an open position where the passage is open to the environment outside the attitude control system and a closed position where the passage is not open to the environment outside the attitude control system.

The main body may include C—ZrOC or C—SiC. The attitude control system may comprise a valve shaft that moves between a first position where the valve is closed and a second position where the valve is open, the valve shaft including a ceramic matrix composite. The valve shaft may include C—ZrOC or C—SiC. Pressure in the accumulator may cause hoop compression of at least a portion of the main body of the valve.

The attitude control system may comprise one or more thrusters coupled to the accumulator. The valve may be an accumulator valve and the attitude control system may comprise a divert valve that moves between an open position where the accumulator and/or the gas generator are in fluid communication with a divert system and a closed position where the accumulator and/or the gas generator are not in fluid communication with the divert system.

In another embodiment, an attitude control system comprises: a gas generator including a propellant; an accumulator coupled to the gas generator, the accumulator being in fluid communication with the gas generator to allow hot gas produced by burning the propellant to flow between the accumulator and the gas generator; and a valve positioned between the gas generator and the accumulator; wherein the attitude control system is a low level attitude control system for a guided missile.

In one embodiment, the total impulse produced by attitude control system may be no more than 700 lbf-sec. The valve may be an accumulator valve and the attitude control system may comprise a vent valve and a passage extending between the gas generator and the accumulator valve, wherein the vent valve moves between an open position where the passage is open to the outside and a closed position where the passage is not open to the outside.

The attitude control system may comprise a valve shaft that moves between a first position where the valve is closed and a second position where the valve is open, the valve shaft including a ceramic matrix composite. Pressure in the accumulator may cause hoop compression of at least a portion of the valve. The valve may comprise a main body including a ceramic matrix composite. The attitude control system may comprise one or more thrusters coupled to the accumulator.

The valve may be an accumulator valve and the attitude control system may comprise a divert valve that moves between an open position where the accumulator and/or the gas generator are in fluid communication with a divert system and a closed position where the accumulator and/or the gas generator are not in fluid communication with the divert system.

In another embodiment, a method for controlling the attitude of a flight vehicle includes: burning propellant in a gas generator to produce hot gas; storing the hot gas in an accumulator; and releasing the hot gas in the accumulator through one or more thrusters to control the attitude of the flight vehicle.

The method may comprise extinguishing the propellant in the gas generator when the pressure in the accumulator reaches a set point. The set point may be a first set point and the method may comprise igniting the propellant in the gas generator when a second set point is reached. The second set point may be a minimum pressure level in the accumulator or a set amount of time that has passed since a previous event.

The method may comprise repeatedly igniting and extinguishing the propellant in the gas generator to repeatedly pressurize the accumulator with the hot gas. The method may comprise burning an initial charge of propellant in the accumulator to pressurize the accumulator with hot gas. The method may comprise igniting the propellant in the gas generator for the first time with the hot gas generated by the initial charge. The method may comprise igniting the propellant in the gas generator with the hot gas stored in the accumulator. The method may comprise igniting propellant in a divert system using the hot gas in the accumulator. The flight vehicle may be a guided missile.

In another embodiment, a method for controlling the attitude of a flight vehicle includes: burning propellant in a gas generator to produce hot gas; storing the hot gas in an accumulator; closing a valve positioned between the gas generator and the accumulator to prevent hot gas from flowing between the gas generator and the accumulator; and extinguishing the propellant in the gas generator.

The method may comprise releasing the hot gas in the accumulator through one or more thrusters to control the attitude of the flight vehicle. Extinguishing the propellant in the gas generator may include opening a vent valve. The method may comprise opening the valve to allow the hot gas in the accumulator to flow to the gas generator and reignite the propellant. Opening the valve may include opening the valve when the pressure in the accumulator reaches a minimum level or a set amount of time has passed since a previous event. Closing the valve can include closing the valve when the pressure in the accumulator reaches a set point. The flight vehicle may be a guided missile.

In some embodiments, at least some or all of the methods described above may be controlled by embedded hardware and software, such as propulsion system control algorithms, to enable, among other things, analog-to-digital and digital-to-analog processing. For example, the valve control states and sequencing may be dynamically simulated. The software may be coded and embedded in a control processor and coupled to or within any suitable elements of the system previous discussed. The processor may execute a primary control algorithm, as well as control other functions related to the operation of the system such as health checks, software updates, maintenance, and signal conditioning.

The processor may include actuator drives, where the actuator drivers may receive position command signals from the propulsion system and translate the command signals into physical movement. A plurality of drivers may each be designed to correspond to a specific actuator type (e.g., piezo, hydraulic, electromechanical, etc.). In addition, the processor may include ignition circuitry. In some embodiments, the ignition circuitry may be designed to control accidental ignition.

In one embodiment, the software component may be considered as part of a flight vehicle avionics component. The flight vehicle avionics component may use a combination of the autopilot and inertial navigation systems to initiate and command the propulsion methods and systems described previously. For example, the flight system avionics may control all flight missile system propulsion systems such as missile interceptor and kinetic warhead divert and attitude control system thrusters. The autopilot and inertial navigation components may be controlled, in part, by sensors such as an inertial measurement unit, infrared camera arrays that provide infrared band images for anti-missile targeting, guidance sensors (e.g. infrared sensors for MDA Missile Interceptor DACS), and other guidance and command inputs. The flight vehicle avionics component may control the propulsion system and other systems described previously.

In some embodiments, the additional components controlled by the software may include proportional thruster electromechanical actuation power distributors, electric three-phase direct current (DC), brushless motor commutation pulse modulation, power conditioning, and position closed loop circuitry, and secondary propulsion systems including safe/arm and fire circuitry to enable subsystem development and safe production and safe shipping for missile system integration activities.

The flight vehicle avionics component may further include a mission timer which enables the performance of pre-programmed operations, such as maneuvers, shutdowns, and/or overrides.

Figure 29:
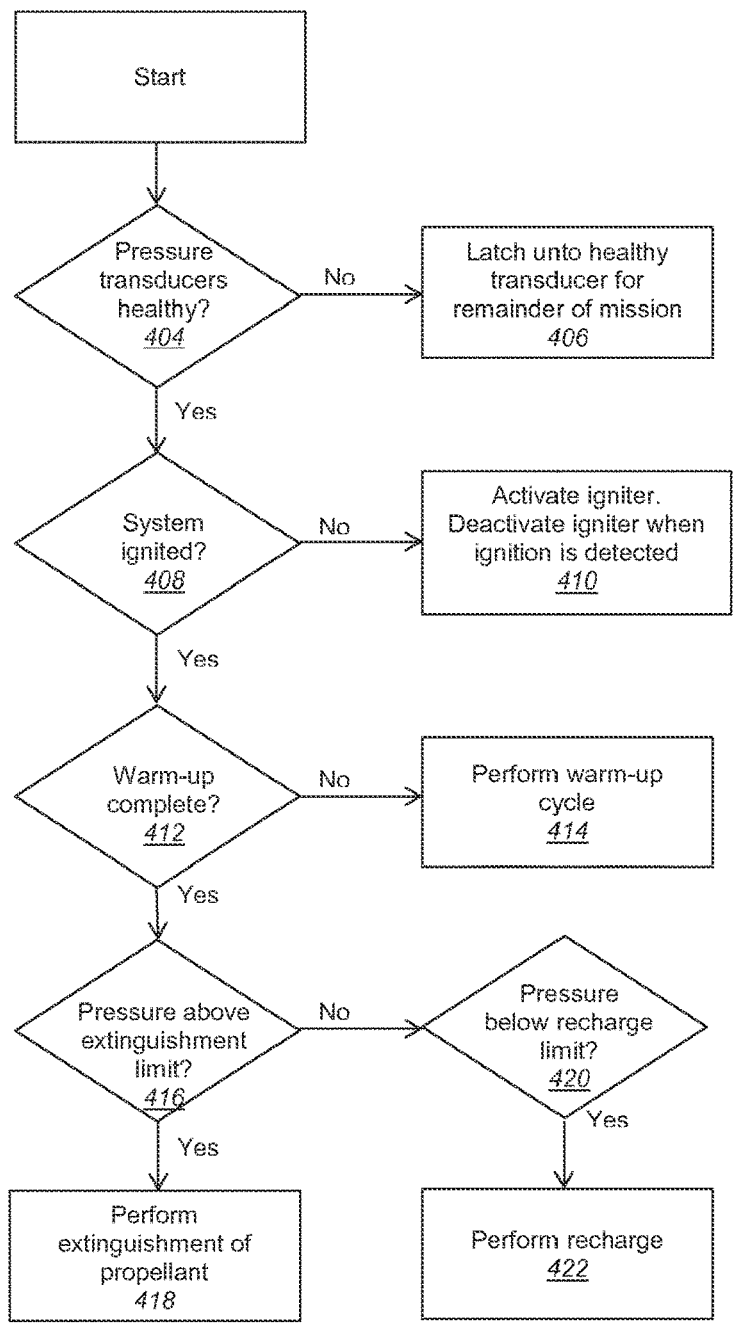
FIG. 29 is a flow chart showing a process algorithm in accordance with at least some embodiments.

FIG. 29 shows a flow chart of an example control system design and algorithm for performing the digital components of the previous disclosure. The algorithm begins with a command to start the system at block 402. The algorithm then moves to block 404 and checks the health of the pressure transducers. In the event that redundant transducers are used, transducer health checks may be used to determine if the transducers are healthy and reading properly. In the event of a failure (i.e., the "no" path from block 404 to block 406), the software logic rejects the failed transducer and latches onto the healthy transducer and the mission proceeds. In one embodiment, transducer failure occurs when one transducer reads >50 psia higher than the other for three consecutive samples. Some situations may require more than three samples (i.e.: 10, 20, 30 samples). If both transducers are working properly, the pressure readings are averaged and the mission moves to the next step.

In block 408, the algorithm determine if the system is ignited. As discussed previously, the propellant is ignited to provide pressurized gas for the thrusters. In one embodiment, an initial standalone igniter is used to begin operation of the systems. The ignitor may be used to safe, arm, and fire igniters as commanded by the algorithm. In another embodiment, if there are redundant igniters, the algorithm may enable the sequencing of firings. If the system has not yet initiated ignition, then the algorithm commands activation of ignition (shown in block 410). Once ignition is detected, the igniter is deactivated. If ignition was previous detected, the algorithm next determines whether the system is warmed-up.

At block 412, the algorithm determines whether the system has gone through the warm-up period. If the system has not, the algorithm commands the system to perform the warm-up cycle (block 414). If the system has gone through the warm-up period, the algorithm then moves on to determine whether the pressure in the accumulator is above a pre-determined extinguishment limit (block 416).

If the algorithm determines the pressure is above the pre-determined extinguishment limit, the algorithm commands extinguishment of the propellant (block 418). If the pressure is not above the pre-determined extinguishment limit, then the algorithm determines whether the pressures is below a pre-determined recharge limit (block 420). If the pressure is not below the recharge limit, then the accumulator is recharged (block 422). In one embodiment, the recharge returns the algorithm to block 408.

One aspect of maintaining prolonged operation is the processor's ability to initiate recharges, extinguishments, and re-ignitions within specified limits. In one embodiment, the control algorithm is programmed to re-ignite/recharge to keep the pressure above 1000 psia for three events, and then 500 psia for subsequent events. Extinguishment keeps the pressure below 2000 psia. In other embodiments, the control algorithm is programmed to take these actions at different pressures depending on the application.

Figure 30:
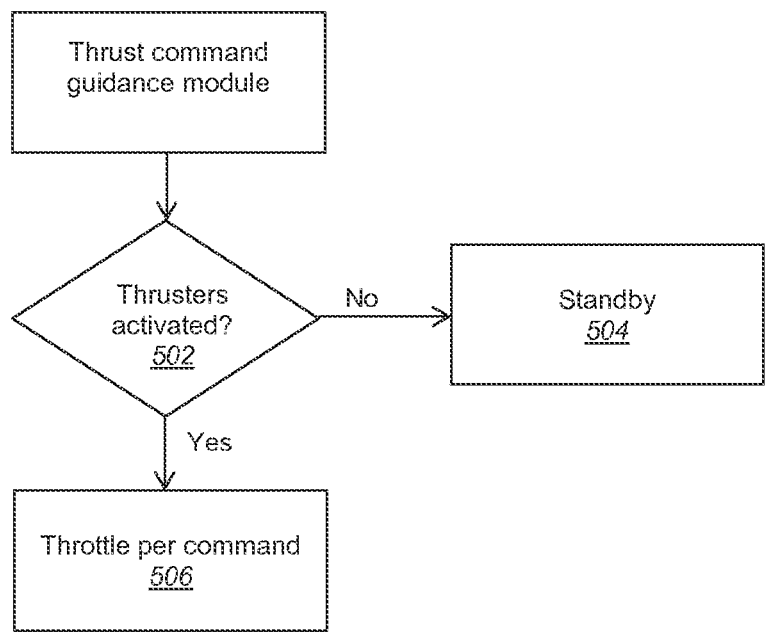
FIG. 30 is a flow chart showing a process algorithm in accordance with at least some embodiments.

FIG. 30 shows a flow chart of an additional example algorithm. In this example embodiment, the algorithm enables control of a thrust command guidance module. The algorithm determines whether the thrusters have been activated (block 502). If the thrusters have not been activated, then system is set to standby (block 504). In some embodiments, the system standsby until some or all of the procedure described with reference to FIG. 29 is complete. If the algorithm determines the thursters have been activated, then the DACS system described previously may be a throttleable DACS (TDCS), and thus the throttling may be further commanded and controlled by the software and hardware described herein. (block 506

In other embodiments, the algorithm may include the following considerations: redline abort logic may determine whether operating pressures exceed pre-determined thresholds, and if so, indicate a shutdown of the hardware to prevent catastrophic failure. In some embodiments, the redline abort logic may be used for development testing and ground use, but may not be needed for on-mission aerospace missions.

In the event of an abort or mission end, the processor can bring the system to a safe condition by sequencing the valves appropriately. This process vents both the gas generator and accumulator and then it keeps the valves locked to keep those plenums vented. In the event of an off-nominal, overridden event (i.e. stand-down, external ignition, timeout), the processor prioritizes certain interrupts as desired.

The digital components of the present disclosure may be implemented in the form of a programmable logic device, masked or field programmable or reprogrammable gate array, programmable array logic, discrete conventional logic, application specific integrated circuit, software algorithm running on a conventional or reduced instruction set microprocessor, microcontroller, or digital signal processor, or partitioned between software and hardware in any combination of the above-mentioned resources ranging from all hardware to all software or any balance therebetween without departing from the spirit of the present disclosure.

Furthermore, at least one program storage device readable by a machine, tangibly embodying at least one program of instructions executable by the machine to perform the capabilities of the present invention can be provided.

The present invention may be included in an article of manufacture (e.g. one or more computer products) having, for example, computer useable media. The media may have computer readable program code means for providing and facilitating the capabilities of the present invention. The article of manufacture may be includes as part of a computer system or sold separately.

It should also be appreciated that some components, features, and/or configurations may be described in connection with only one particular embodiment, but these same components, features, and/or configurations can be applied or used with many other embodiments and should be considered applicable to the other embodiments, unless stated otherwise or unless such a component, feature, and/or configuration is technically impossible to use with the other embodiment. Thus, the components, features, and/or configurations of the various embodiments can be combined together in any manner and such combinations are expressly contemplated and disclosed by this statement.

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure the term shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope.

The subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be given their broadest interpretation in view of the prior art and the meaning of the claim terms.

As used herein, spatial or directional terms, such as "left," "right," "front," "back," and the like, relate to the subject matter as it is shown in the drawings. However, it is to be understood that the described subject matter may assume various alternative orientations and, accordingly, such terms are not to be considered as limiting.

Articles such as "the," "a," and "an" can connote the singular or plural. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all of the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

All disclosed ranges are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

All disclosed numerical values are to be understood as being variable from 0-100% in either direction and thus provide support for claims that recite such values or any and all ranges or subranges that can be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range (e.g., 15.2).

The flow diagrams depicted herein are just exemplary. There may be many variations to these diagrams or the steps (or operations) described therein without departing from the spirit of the invention. For instance, the steps may be performed in a somewhat differing order, or steps may be added, deleted or modified. All of these variations are considered a part of the claimed invention.

What is claimed is:

1. A method comprising:
   positioning an initial charge of solid propellant in an accumulator;
   igniting the initial charge of solid propellant, producing hot gas, and pressurizing the accumulator;
   determining that the pressure in the accumulator has reached an initial threshold;
   opening a first valve and allowing hot gas to flow from the accumulator to a gas generator based upon the pressure in the accumulator reaching the initial threshold, the hot gas igniting solid propellant in the gas generator;
   closing the first valve; and
   extinguishing the solid propellant in the gas generator by opening a second valve and depressurizing the gas generator.

2. The method of claim 1, further comprising:
   determining that the pressure in the accumulator has reached a lower threshold and/or a predetermined amount of time has elapsed since the first valve closed; and
   opening the first valve and allowing hot gas to flow from the accumulator to the gas generator based upon the pressure in the accumulator reaching the lower threshold and/or the predetermined amount of time elapsing since a previous event, the hot gas igniting the solid propellant in the gas generator.

3. The method of claim 2, further comprising:
   maintaining the second valve in an open state until the pressure in the accumulator has reached the lower threshold.

4. The method of claim 1, further comprising releasing hot gas from the accumulator through at least one thruster.

5. The method of claim 4 further comprising controlling attitude adjustments to a flight vehicle by controlling the release of the hot gas through the at least one thruster.

6. The method of claim 1, further comprising:
   determining that the pressure in the accumulator has reached an upper threshold; and
   closing the first valve based upon the pressure in the accumulator reaching the upper threshold.

7. The method of claim 6, further comprising extinguishing the solid propellant in the gas generator based upon the pressure in the accumulator reaching the upper threshold.

8. The method of claim 6, further comprising:
   determining that the pressure in the accumulator has reached a lower threshold and/or a predetermined amount of time has elapsed since the pressure in the accumulator reached the upper threshold; and
   opening the first valve and allowing hot gas to flow from the accumulator to the gas generator based upon the pressure in the accumulator reaching the lower threshold and/or the predetermined amount of time elapsing since the pressure in the accumulator reached the upper threshold, the hot gas igniting the solid propellant in the gas generator.

9. The method of claim 1, further comprising:
   (a) determining that the pressure in the accumulator has reached an upper threshold;
   (b) closing the first valve and extinguishing the solid propellant in the gas generator based upon the pressure in the accumulator reaching the upper threshold;
   (c) determining that the pressure in the accumulator has reached a lower threshold and/or a predetermined amount of time has elapsed since the pressure in the accumulator reached the upper threshold; and
   (d) opening the first valve and allowing hot gas to flow from the accumulator to the gas generator based upon the pressure in the accumulator reaching the lower threshold and/or the predetermined amount of time elapsing since the pressure in the accumulator reached the upper threshold, the hot gas igniting the solid propellant in the gas generator.

10. The method of claim 9, further comprising repeating steps (a)-(d) at least twice.

11. A flight vehicle position control method comprising:
    burning an initial charge of propellant in an accumulator and pressurizing the accumulator with hot gas;
    burning propellant in a gas generator and producing hot gas;
    storing the hot gas from the gas generator in an the accumulator, the gas generator and the accumulator being part of the flight vehicle; and
    releasing the hot gas stored in the accumulator through one or more thrusters to control the position of the flight vehicle.

12. The method of claim 11 comprising
    determining that the pressure in the accumulator has reached an upper threshold; and
    extinguishing the propellant in the gas generator based upon the pressure in the accumulator reaching the upper threshold.

13. The method of claim 12 comprising
    determining that a set point has been reached; and
    igniting the propellant in the gas generator based upon the set point being reached.

14. The method of claim 13 wherein the set point is a lower threshold of the pressure in the accumulator or a set amount of time that has passed since a previous event.

15. The method of claim 11 comprising repeatedly igniting and extinguishing the propellant in the gas generator and repeatedly pressurizing the accumulator with the hot gas from the gas generator.

16. The method of claim 11 comprising igniting the propellant in the gas generator for the first time with the hot gas generated by the initial charge.

17. The method of claim 11 comprising igniting the propellant in the gas generator with the hot gas stored in the accumulator.

18. The method of claim 11 wherein the flight vehicle is a guided missile.

19. A flight vehicle position control method comprising:
    burning propellant in a gas generator and producing hot gas;
    storing the hot gas in an accumulator, the gas generator and the accumulator being part of the flight vehicle;
    closing a valve positioned between the gas generator and the accumulator and preventing hot gas from flowing between the gas generator and the accumulator;
    extinguishing the propellant in the gas generator; and
    opening the valve and allowing the hot gas to flow from the accumulator to the gas generator and reignite the propellant.

20. The method of claim 19 comprising releasing the hot gas in the accumulator through one or more thrusters and controlling the attitude of the flight vehicle.

21. The method of claim 19 wherein extinguishing the propellant in the gas generator includes opening a vent valve.

22. The method of claim 19 comprising:
    determining that the pressure in the accumulator has reached a lower threshold or a set amount of time has passed since a previous event; and opening the valve based upon the pressure in the accumulator reaching the lower threshold or passage of the set amount of time since the previous event.

23. The method of claim 19 comprising:
determining that the pressure in the accumulator has reached an upper threshold; and
closing the valve based upon the pressure in the accumulator reaching the upper threshold.

24. The method of claim 19 wherein the flight vehicle is a guided missile.

25. A flight vehicle position control method comprising:
burning propellant in a gas generator and producing hot gas;
storing the hot gas in an accumulator, the gas generator and the accumulator being part of the flight vehicle;
releasing the hot gas in the accumulator through one or more thrusters to control the position of the flight vehicle;
extinguishing the propellant in the gas generator; and
reigniting the propellant in the gas generator with the hot gas stored in the accumulator.

26. The method of claim 25 comprising:
determining that the pressure in the accumulator has reached an upper threshold; and
extinguishing the propellant in the gas generator based upon the pressure in the accumulator reaching the upper threshold.

27. The method of claim 26 comprising: determining that a set point has been reached; and reigniting the propellant in the gas generator based upon the set point being reached.

28. The method of claim 27 wherein the set point is a lower threshold of the pressure in the accumulator or a set amount of time that has passed since a previous event.

29. The method of claim 25 comprising repeatedly igniting and extinguishing the propellant in the gas generator and repeatedly pressurizing the accumulator with the hot gas.

30. The method of claim 25 comprising:
burning an initial charge of propellant in the accumulator and pressurizing the accumulator with hot gas; and
igniting the propellant in the gas generator for the first time with the hot gas generated by the initial charge.

31. The method of claim 25 wherein the flight vehicle is a guided missile.

* * * * *